(12) United States Patent
Blaschyk et al.

(10) Patent No.: US 11,204,339 B2
(45) Date of Patent: Dec. 21, 2021

(54) PREPARATIVE COLUMN CHROMATOGRAPHY SYSTEM

(71) Applicant: Hoffmann-La Roche Inc., Little Falls, NJ (US)

(72) Inventors: Andreas Blaschyk, Penzberg (DE); Darko Dvekar, Penzberg (DE); Christian Schmalz, Loerrach (DE)

(73) Assignee: Hoffmann-La Roche Inc., Little Falls, NJ (US)

( * ) Notice: Subject to any disclaimer, the term of this patent is extended or adjusted under 35 U.S.C. 154(b) by 1295 days.

(21) Appl. No.: 14/356,973

(22) PCT Filed: Nov. 6, 2012

(86) PCT No.: PCT/EP2012/071935
§ 371 (c)(1),
(2) Date: May 8, 2014

(87) PCT Pub. No.: WO2013/068349
PCT Pub. Date: May 16, 2013

(65) Prior Publication Data
US 2014/0305195 A1    Oct. 16, 2014

(30) Foreign Application Priority Data

Nov. 10, 2011    (EP) .................................... 11188582

(51) Int. Cl.
*G01F 23/16*    (2006.01)
*G01N 30/38*    (2006.01)
(Continued)

(52) U.S. Cl.
CPC ......... *G01N 30/38* (2013.01); *B01D 19/0042* (2013.01); *G01F 23/165* (2013.01);
(Continued)

(58) Field of Classification Search
CPC ........ G01N 30/02; G01N 30/26; G01N 30/34; G01N 30/342; G01N 30/345;
(Continued)

(56) References Cited

U.S. PATENT DOCUMENTS 2,884,366 A  *  4/1959  Anderson ................. B01L 5/02
                                                204/400
3,295,297 A  *  1/1967  Collins ............... A61M 1/3627
                                                210/445
(Continued)

FOREIGN PATENT DOCUMENTS

EP        0444441 A2    9/1991
EP        1155721 A1    11/2001
(Continued)

OTHER PUBLICATIONS

International Preliminary Report dated May 13, 2014, for PCT Application No. PCT/EP2012/071935, filed Nov. 6, 2012.
(Continued)

*Primary Examiner* — Dean Kwak
(74) *Attorney, Agent, or Firm* — Morrison & Foerster LLP

(57) ABSTRACT

A chromatography system comprising a mixing circuit or a mixing chamber, a bubble trap, a concentration detector and one or more pumps, characterized in that the bubble trap has a permanent opening at its highest point is described herein. Furthermore, a chromatography system is described, characterized in that it contains two concentration detectors the first of which is located in the mixing circuit or the mixing chamber and the second is located downstream of the main pump.

9 Claims, 29 Drawing Sheets

Figure 1:
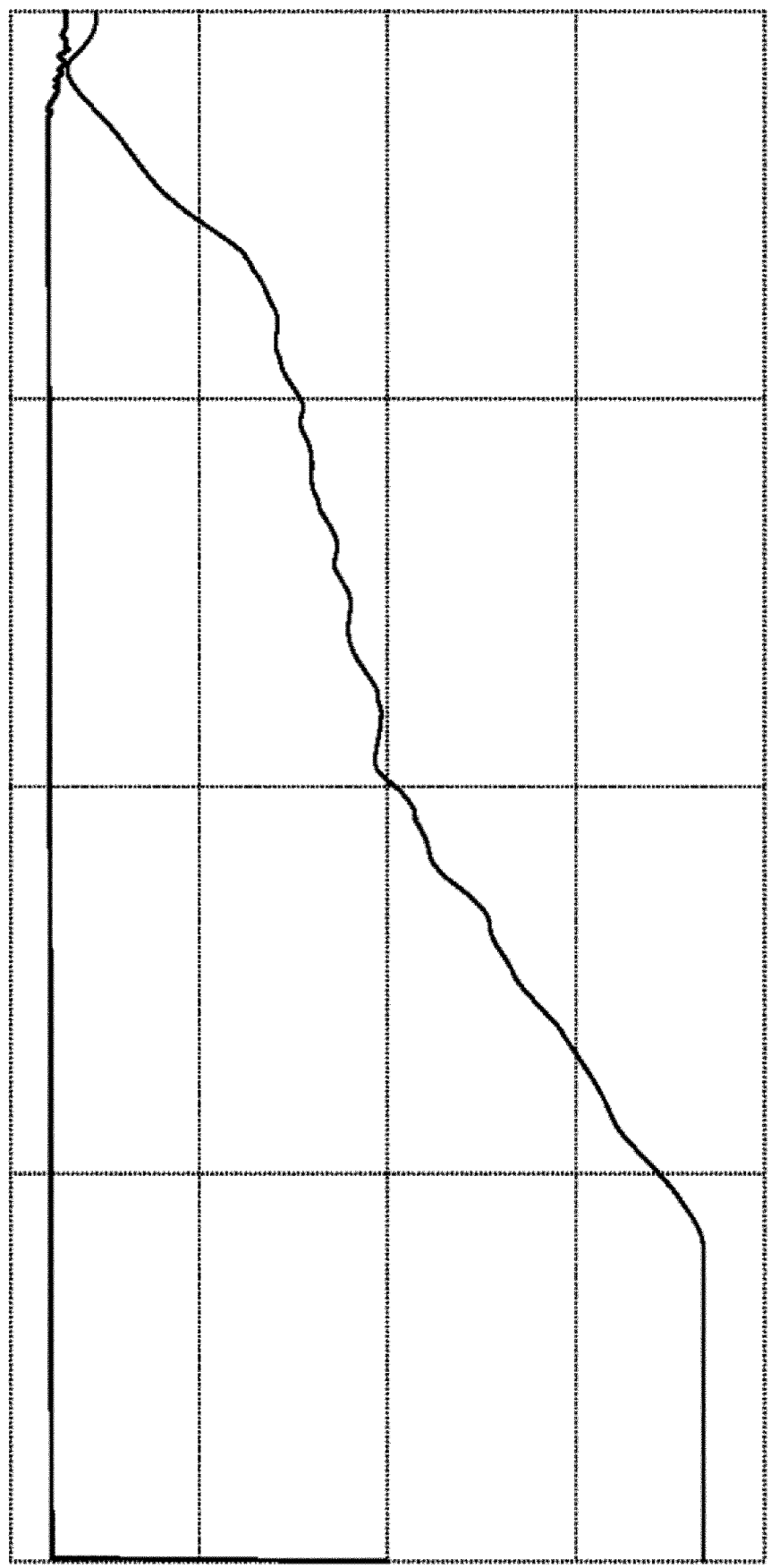

(51) Int. Cl.
*G01N 30/74* (2006.01)
*G01N 30/32* (2006.01)
*B01D 19/00* (2006.01)
*G01N 21/359* (2014.01)

(52) U.S. Cl.
CPC ............. *G01N 30/32* (2013.01); *G01N 30/74* (2013.01); *G01N 21/359* (2013.01); *G01N 2030/328* (2013.01)

(58) Field of Classification Search
CPC ................ G01N 30/347; G01N 30/36; G01N 2030/328; G01N 21/359; G01N 30/32; G01N 30/38; G01N 30/74; B01D 19/0042
USPC ..................................... 422/70, 89; 436/161
See application file for complete search history.

(56) References Cited

U.S. PATENT DOCUMENTS

| | | | | | |
|---|---|---|---|---|---|
| 3,833,013 | A | * | 9/1974 | Leonard | A61M 1/3627 137/171 |
| 3,996,027 | A | * | 12/1976 | Schnell | A61M 1/3627 210/512.1 |
| 4,116,046 | A | | 9/1978 | Stein | |
| 4,806,135 | A | * | 2/1989 | Siposs | A61M 1/3627 210/304 |
| 5,112,492 | A | * | 5/1992 | Ransohoff | B01D 15/08 210/129 |
| 2009/0272204 | A1 | | 11/2009 | Roloff et al. | |
| 2010/0278709 | A1 | | 11/2010 | Waller | |
| 2011/0073548 | A1 | | 3/2011 | Williams et al. | |

FOREIGN PATENT DOCUMENTS

| | | |
|---|---|---|
| EP | 2113770 A1 | 11/2009 |
| JP | S58-079155 | 5/1983 |

OTHER PUBLICATIONS

International Search Report dated Jan. 18, 2013, for PCT Application No. PCT/EP2012/071935, filed Nov. 6, 2012.
Written Opinion dated Jan. 18, 2013, for PCT Application No. PCT/EP2012/071935, filed Nov. 6, 2012.

* cited by examiner

--Prior Art--

--Prior Art--

PREPARATIVE COLUMN CHROMATOGRAPHY SYSTEM

This application is a 35 USC 371 of International Patent Application No. PCT/EP2012/071935 filed Nov. 6, 2012; which claims priority benefit to EP 11188582.8 filed Nov. 10, 2011, each of which are hereby incorporated herein by reference in their entireties.

The present invention concerns a preparative column chromatography system. One element of the system is the use of two NIR detectors, one upstream of the chromatography column and one downstream of the chromatography column to set up and monitor an elution gradient as well as to continuously check the quality of the HPLC columns that were used. Another element is a newly designed mixing circuit with a variably closable bubble trap which is separated from the mixing circuit of the system and can divide the volume flow.

TECHNICAL BACKGROUND

Nowadays conventional preparative HPLC systems are built individually for certain dimensions because the gradient formation in a system is not exactly transferable to different dimensions. In addition it is almost impossible to transfer the process conditions to analytical or semi-preparative systems. This applies equally to the transfer of gradients to systems of a different design.

The application-related high nitrogen and gas contents of the eluents used in chromatographies may result in the liberation of gas dissolved in the eluent during gradient formation which, on the one hand, has an adverse effect on the NIR measurement upstream of the chromatography column and correspondingly also on gradient formation and its reproducibility. On the other hand, the HPLC columns and in particular the column packing are also affected by this because gas is also liberated within the column packing which can result in the formation of cracks or inhomogeneities within the column packing. In conventional HPLC systems the bubble traps which are installed in the systems cannot fulfil a complete degassing function because, like the entire mixing circuit, they are under pressure.

US 2011/073548 reports a separation system and method. Minimizing eluate band widths in liquid chromatography is reported in EP 0 444 441. In U.S. Pat. No. 4,116,046 a liquid chromatography system is reported. A device and method for the reduction of the ethanol fraction in a liquid preparation is reported in EP 2 113 770.

SUMMARY OF THE INVENTION

A gradient in a preparative HPLC system is usually controlled by means of the defined delivery volumes of the pumps, but the actual gradient is not taken into account. Also volume contraction effects are not taken into consideration.

In this case a novel multiscale HPLC system with an additional multifunctional NIR measurement which optionally can either be placed downstream of the chromatography column or directly upstream of the column (but in any case downstream of the high pressure pump) and a modified gradient mixing circuit with a degassing function is described and claimed herein.

In this application a chromatography system comprising a mixing circuit or a mixing chamber, a bubble trap, a concentration detector and one or more pumps, characterized in that the bubble trap has a permanent opening at the highest point, the degree of opening of which can be adjusted is described as one aspect.

Gas escaping from the liquid and also excess liquid can be removed at any time from the bubble trap through the permanent opening at a predefined, adjustable volume flow. Furthermore, the permanent opening improves the degassing of the liquid.

In one embodiment the bubble trap is located outside or downstream of the mixing circuit or the mixing chamber. In one embodiment the inflow into the bubble trap is adjustable. In one embodiment it is adjusted by means of a valve.

The ability to adjust the inflow to the bubble trap enables an adjustment of the amount of liquid which is passed onto the chromatography column after leaving the mixing circuit or which is removed from the system through the bubble trap at its highest point. This can for example improve the control or facilitate the formation of a predetermined gradient on a chromatography column. The required through-flow volume can be adapted in conjunction with a second concentration detector downstream of the main pump of the system so that the volumetric quantity separated by the bubble trap can be minimized or even avoided. This is achieved by comparing the actual gradient with the target gradient and adjusting the opening of the valve to the bubble trap and the valve at its highest point accordingly.

In one embodiment the bubble trap is located within the mixing circuit or the mixing chamber.

In one embodiment the volume flow rate can be adjusted by the permanent opening. In one embodiment the adjustment is by means of a valve.

Regulation of the overflow amount in the bubble trap makes it, on the one hand, possible to adjust the quality of degassing. On the other hand, it allows an adjustment of the amount of discharged liquid volume.

In one embodiment a first volume flow measuring device is located downstream of the permanent opening of the bubble trap and a second volume flow measuring device is located downstream of the column.

In one embodiment the chromatography system contains a second concentration detector downstream of the main pump.

A further aspect as described herein is a chromatography system, characterized in that it contains two concentration detectors of which the first is located in the mixing circuit or the mixing chamber and the second is located downstream of the main pump.

As a result of the arrangement of two concentration detectors, and namely one in the mixing circuit or in the mixing chamber and a second downstream of the main pump, it is possible to check the efficiency of the chromatography system by comparing the value of the second concentration detector with the value of the first concentration detector. In the case of a deviation (after a time correction allowing for the time period between passing the first concentration detector and passing the second concentration detector) between the two signals, it is possible to conclude that there has been a loss of system efficiency.

In one embodiment a chromatography column is located between the main pump and the second concentration detector.

A further aspect is the use of a chromatography system as described herein to check the efficiency of the entire chromatography system.

An aspect is also the use of a chromatography system as described herein to check the integrity of the chromatography column.

The arrangement of two concentration detectors and namely one in the mixing circuit or in the mixing chamber and a second downstream of the chromatography column, allows the integrity of the chromatography system to be checked by comparing the value of the second concentration detector with the value of the first concentration detector. In conjunction with the use of the arrangement to check the efficiency of the chromatography system as described herein, a difference between the two detector signals may be due to a system-related or a column-related problem. In the case of a deviation (after a time correction allowing for the time period between passing the first concentration detector and passing the second concentration detector) between the two signals, it is possible to conclude that there has been a loss of system integrity.

Another aspect as described herein is the use of the ratio formed from the signal of the first concentration detector and the signal of the second concentration detector to control a chromatography system.

If the signals determined by the two concentration detectors differ from one another, then it is possible to make an adjustment to the chromatography system. It can be regulated after or before a chromatographic separation and also during a separation that is on-going i.e. online. For the regulation it is possible to use the ratio of eluent in the mixing circuit or in the mixing chamber, the opening of the valve to the bubble trap, the opening of the permanent valve of the bubble trap, the discharge rate from the mixing circuit or the volume flow to the chromatography column.

In one embodiment the concentration detector is a UV detector, an NIR detector, a pH detector or a conductivity detector and preferably a UV detector or an NIR detector.

DETAILED DESCRIPTION OF THE INVENTION

Herein is reported a chromatography system characterized in allowing/performing a continuous degassing during the formation of a gradient, whereby the gradient is formed in a mixing circuit, whereby the system comprises a bubble trap which is characterized in comprising an adjustable valve at its highest point, whereby the continuous degassing is achieved by the interaction of the opening of the adjustable valve of the bubble trap and the pumping speed of the main pump. The presence of the valve in the bubble trap ensures that the amount of eluent that can enter the bubble trap is aligned with the amount of eluent that is processed, i.e. applied to the column, by the main pump, i.e. which is removed from the mixing circuit.

In addition it is possible to allow surplus eluent that is withdrawn from the mixing circuit to leave the bubble trap via the valve of the bubble trap. In this operation mode a multi scale application of the chromatography system is possible, i.e. the system can be operated with columns of different diameter and size, i.e. below the planned capacity of the chromatography system. This is important as preparative large scale chromatography systems are designed and build in general to be operated with a single column, i.e. of defined size and diameter. In addition it is possible to realize identical gradients at different flow rates, which also allows the use of chromatography columns of different size/diameter with the same preparative/large scale chromatography system.

The adjustable valve at the highest point of the bubble trap or in the pipe leaving the bubble trap allows realizing different pressures within the bubble trap which are completely independent of the pressure in the mixing circuit.

Thus, the bubble trap as reported herein defines an individual, independent system allowing a designed large scale chromatography system to be operated with the flexibility as reported herein.

A large proportion of dissolved gases is present in the mixed eluents in the mixing circuit of HPLC systems. Due to the necessary pressurization only a slight gas liberation is possible there.

In known HPLC systems a pressurized bubble trap is used in which there is a comparable pressure to that in the mixing circuit. Thus, there is only a very slight gas release in such a bubble trap. Also the miscibility is poor in the bubble trap due to the slow or low inflow rate when small process dimensions that are associated with low flow rates are processed (see schematic diagram in FIGS. 17 and 19).

The unpressurized (overflowable) bubble trap described herein which is separated from the mixing circuit by means of a controllable shutoff device, e.g. a valve, allows a stronger release of gases dissolved in the eluent. Furthermore, excess gradient mixture can be discharged. There is also a very good miscibility due to the rapid inflow (see schematic diagram in FIG. 18).

With the aid of the HPLC system described herein it is possible to check the quality of the transferability of the gradients formed in the mixing circuit onto the column. Thus, it is possible to detect changes in a programmed gradient that occur for example due to interfering factors or unfavourable conditions in the HPLC system (see FIGS. 15, 23, 24, 25 and 26).

Also with the aid of the HPLC system described herein it is possible to determine the quality of the HPLC columns that are used before and during the process steps because it is possible to dispense with determinations of plate numbers after which the columns have to be subjected to a regeneration procedure which is the greatest stress for the columns so that they may be damaged and can no longer be used for the production (see FIGS. 6, 7, 8, 9, 10, 27, 28, 29).

A preparative HPLC system is described herein in which the gradient-forming mixing circuit of the system is designed for the largest dimension to be processed in order to provide the required amount of mixed eluent according to the process dimension in the bubble trap which is located downstream of the mixing circuit. The required volume flow is applied to the column by the main pump and the remainder is discharged from the system through the open bubble trap which is no longer integrated into the mixing circuit (see FIGS. 20, 21 and 22).

It was found that with this arrangement the gradient is always generated under identical conditions and is transferred to the columns in the same quality. The amount of unused eluent that is discharged from the system through the bubble trap, varies according to the dimension of the column and the volume flow rate of the eluent. In the case of the smallest processed dimension the discharged amount is largest and in the case of the largest dimension the smallest amounts are discharged. The gradient applied to the columns is in every case identical and the different column dimensions can be operated under identical process conditions. This results in a gain in process quality and reliability (see FIGS. 3, 11, 12, 14, 20, 21 and 22).

It was also found that using an additional (second) NIR measurement downstream of the chromatography column, enables a gradient to be transferred to any column dimension and any system design. The NIR signal detected in the measurement line downstream of the column represents the leading parameter according to which the system programming takes place until the result measured downstream of the column is the same as the desired result (target value) (see FIG. 15).

An intensive outgassing of the eluent is achieved by the open bubble trap. This intensive outgassing which can now take place in the bubble trap that is separated from the mixing circuit is supplemented by an improved miscibility of the liquid that flows in. In this manner large amounts of dissolved gas can be removed continuously from the mixing circuit. This reduces interferences of the NIR signal and leads to an improved and more reproducible gradient formation on the chromatography column. The amounts of gas discharged from the system also no longer put a stress on the downstream HPLC columns which substantially increases the robustness of this process step (see FIGS. 2, 3, 4 and 14).

The implementation of the additional NIR measurement enables the quality of the gradient applied to the columns to be monitored continuously or at a desired frequency. System disorders are immediately detected and can be immediately corrected.

The quality of the columns that are used can be continuously monitored by means of the NIR measurement downstream of the chromatography column. This can for example be carried out by comparing the gradients upstream and downstream of the column. An inhomogeneous or damaged column packing or column hardware distorts the gradient migrating through the column, because the liquid always seeks the path of least resistance and this is for example within column cracks. If both gradients are compared, it is possible to determine if there are any differences. In the case of gradients that deviate from one another which indicates a damaged column, the column can be removed immediately from the process or be subjected to a separate test procedure or repair measures, and namely even before losses in product batches occur. This procedure can also be used during the column regenerations which are carried out after column tests. Hence, the column quality can be assessed directly before the separation with the option of implementing suitable measures if required in a timely manner (see FIGS. 6, 7, 8, 9, 10, 27, 28, 29).

The use of the additional NIR measurement enables (in addition to the continuous monitoring of the gradient migrating through the column) a short impulse in the form of a small amount of solvent (preferably buffer B) to be applied to the column in the equilibration phase, after the regeneration and directly before the product is applied and an assessment of the shape of the peak that is formed after it leaves the column. This can take place before each product application and does not require a column regeneration afterwards. A multiple continuous monitoring of the column quality can be carried out with the aid of an additional NIR measurement downstream of the chromatography column in combination with the NIR measurement upstream of the chromatography column and the quality and robustness of the HPLC step can thus be improved (see FIGS. 9 and 10).

The second NIR detector downstream of the chromatography column additionally makes it possible to utilize the degassing and multiscale function because it is required for the optimization of the required system design (e.g. volume and design of the bubble trap) and for the optimal adjustment of the components involved (e.g. mixing circuit pump and valves). After the system has been optimally adjusted it constantly fulfils a continuous monitoring function and, if necessary, allows immediate corrections (see FIGS. 23, 24, 25 and 26).

A new design of a HPLC system is described herein in which the bubble trap is separated from the mixing circuit. The separation of the bubble trap from the mixing circuit by means of an adjustable valve and the open configuration of the bubble trap i.e. the ability to remove inflowing gas and inflowing eluent i.e. enabling the bubble trap to overflow, provides an improved solution for degassing the eluents before they reach the column (see FIG. 18).

Freeing the eluents of their gas content results in two substantial improvements:
 the quality of the chromatography column is improved because outgassing on the column is reduced or even eliminated;
 the quality of the gradients formed in the mixing circuit is improved because no gas bubbles can influence the NIR signal.

These advantages can be further improved by a second NIR reference measurement downstream of the chromatography column.

The overflowable bubble trap improves the gradient formation and outgassing function. This can for example be accomplished by
 visible outgassing in the bubble trap and removal of the bubbles from the system;
 improved gradient formation in the mixing circuit (signal of the first NIR measurement).

In conjunction with the overflowable bubble trap, a second NIR measurement after the chromatography column can or does make it possible to
 check the transferability of the gradients formed in the mixing circuit onto the column; this function is independent of the mode of operation of the mixing circuit or the design of the system;
 an optimal adjustment of the gradients in the various dimensions.

The additional functions of the NIR reference measurement, and namely the checking of the quality of the system and the column (independently of one another), are independent of the overflowable bubble trap.

The separation of the bubble trap from the mixing circuit enables more volume to flow through and be discharged by the bubble trap than that which is passed by the main pump onto the column. In this case the bubble trap is overflowed and does not only discharge gasses but also a portion of the mixed eluent quantity. This operation mode is for example necessary in the case of very steep or complicated gradients which require a rapid flow through the bubble trap in order to among others effectively discharge the gas quantities that are formed. This results in the formation of gradients as they have been programmed and/or to a more stable and qualitatively improved course of the gradients. The overflowing of the bubble trap can be used for the transfer of gradients without a major adaptation (1:1) in the case of an upscale or downscale of the system or generally to improve the gradient quality.

This technical aspect is in principle independent of the second NIR measurement downstream of the chromatography column. The system adjustments and the system reliability can be further improved by the second NIR reference measurement.

A chromatogram of a 10 cm diameter chromatography column is shown in FIG. 1 in which the course of a faulty separation gradient is seen. This results in deviations in the process course. This signal was generated using the NIR measurement in the mixing circuit.

Figure 13:
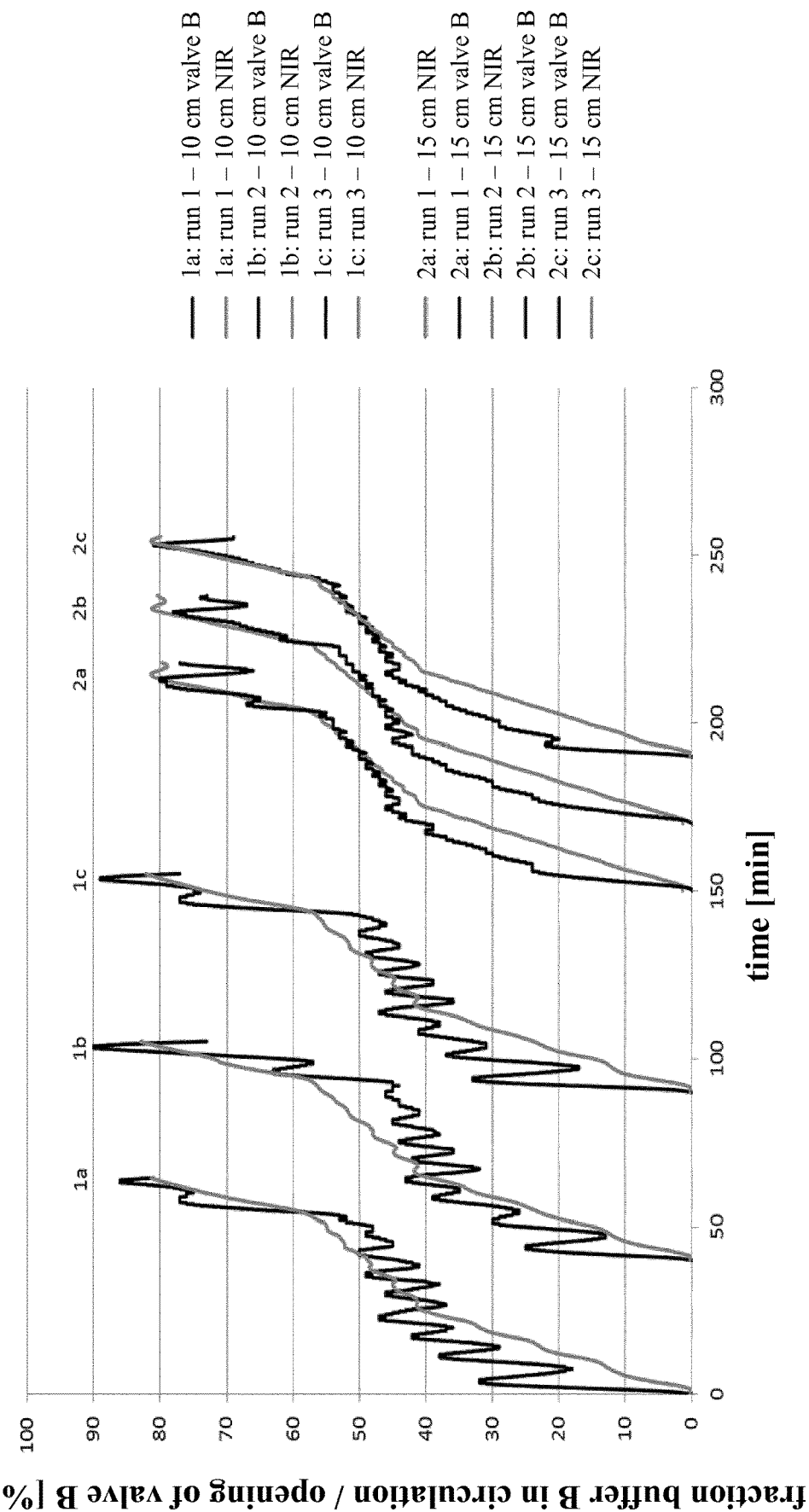

In FIG. 13 three gradient time courses of the 15 cm diameter HPLC column are shown on the left and three gradient time courses of the 10 cm diameter HPLC column are shown on the right which were obtained in a conventional system. The non-reproducible and variable gradient time courses and degrees of opening of the acetonitrile valve are evident in both dimensions. These signals were generated with the NIR measurement in the mixing circuit i.e. upstream of the column.

Figure 2:
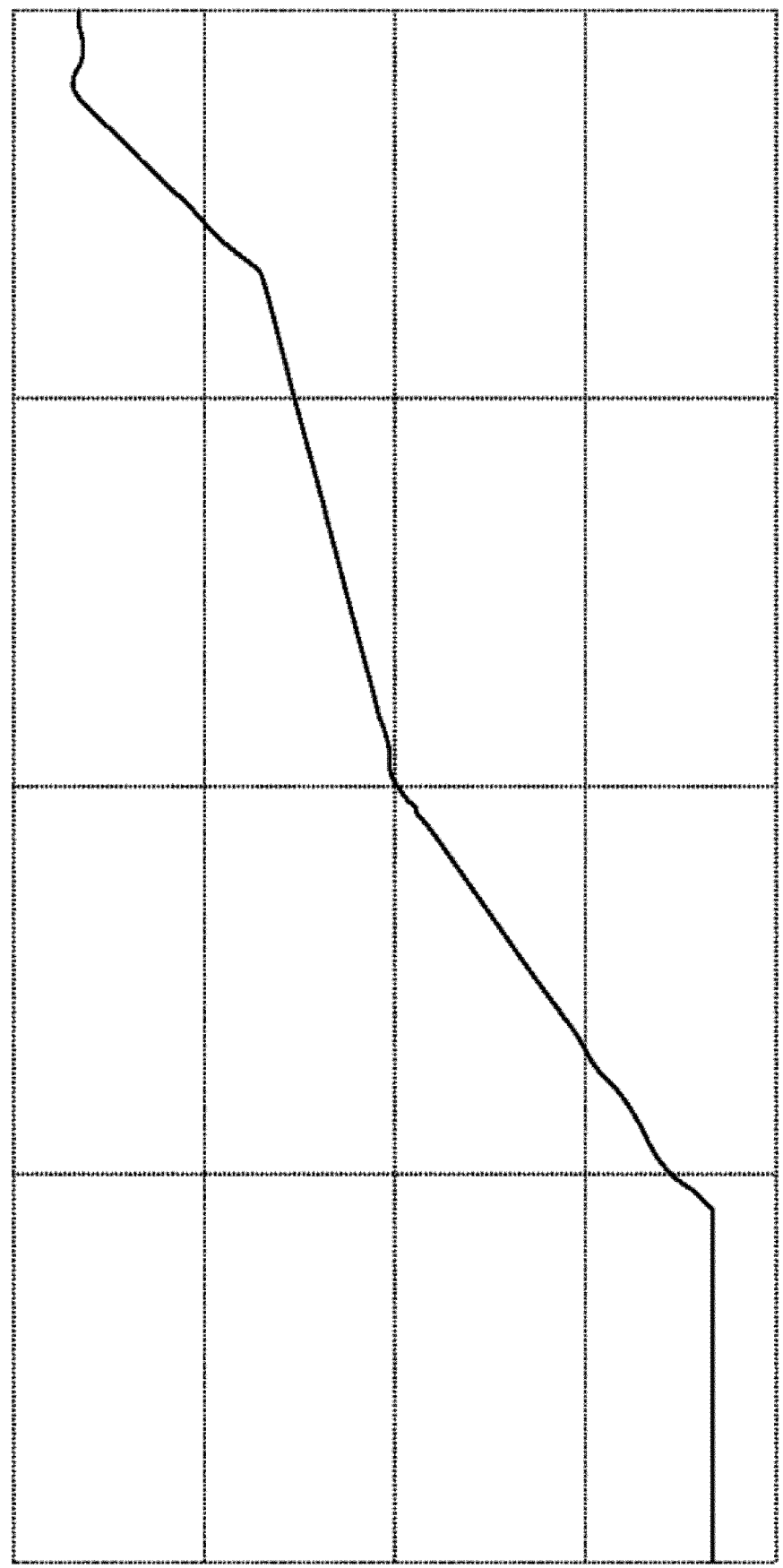

A chromatogram of a 10 cm diameter chromatography column is shown in FIG. 2 on which the time course of a separation gradient after opening the bubble trap and allowing it to overflow is shown. This time course is good and reproducible. This signal was generated with the NIR measurement in the mixing circuit.

Figure 5:
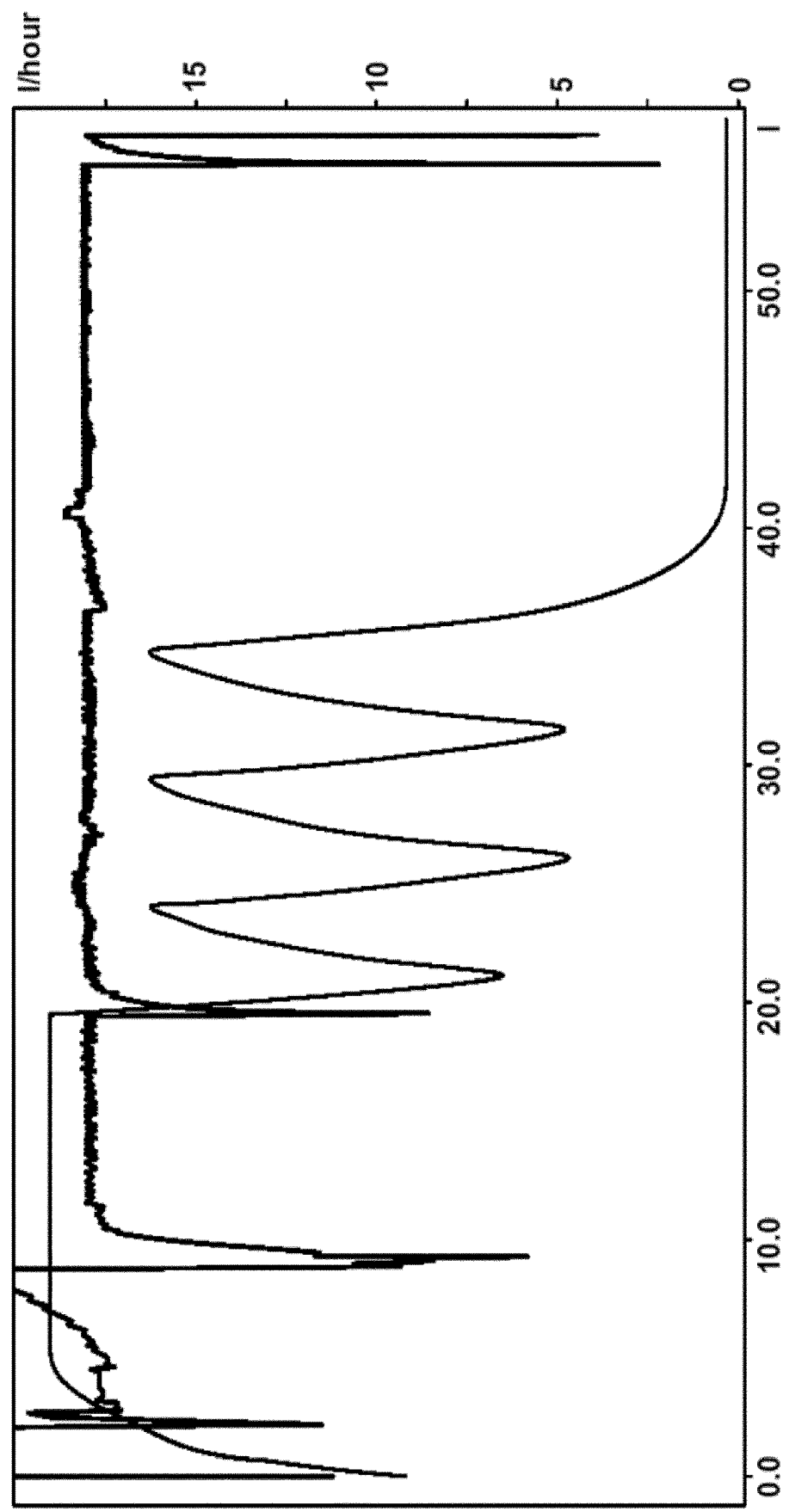

FIG. 5 shows a chromatogram of a 10 cm diameter chromatography column on which the time course of a deficient regeneration gradient peak is seen. The gradient peaks are not sharply executed. This signal was generated with the NIR measurement in the mixing circuit.

Figure 4:
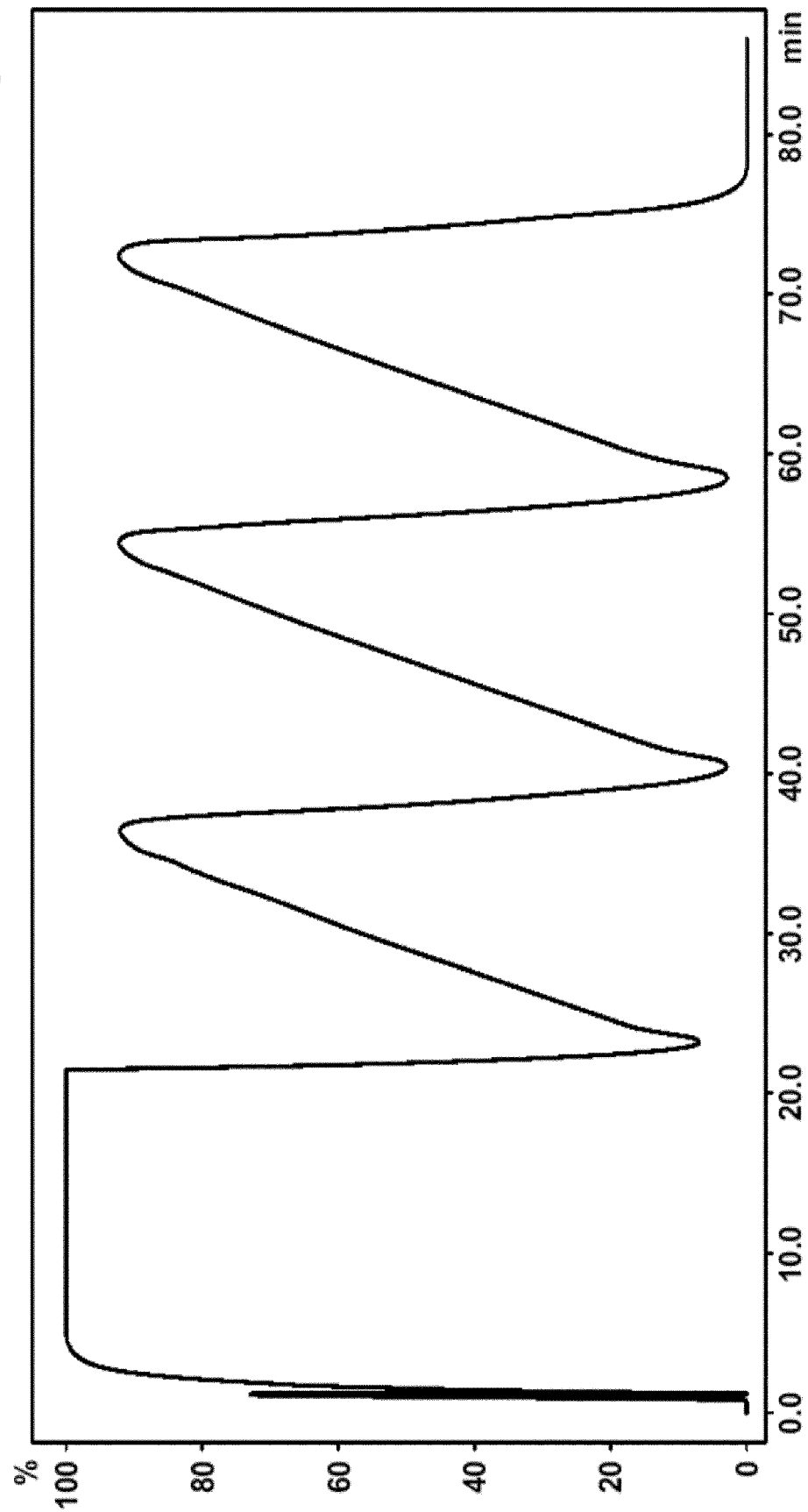

A chromatogram of a 10 cm diameter chromatography column is shown in FIG. 4 on which the time course of a regeneration gradient after opening the bubble trap and allowing it to overflow is shown. The gradient peaks are exactly and reproducibly executed. This signal was only generated with the NIR measurement in the mixing circuit.

Furthermore, a very efficient degassing effect is achieved by opening the bubble trap which results from the abrupt pressure drop.

The following examples and figures are provided in order to illustrate the subject matter of the invention. The protective scope is defined by the attached patent claims. It is clear that modifications can be made on the subject matter of the disclosed methods without leaving the subject matter of the invention.

FIG. 1 shows a chromatogram of a 10 cm HPLC chromatography column in which the time course of a defective separation gradient is shown. This leads to deviations in the process course due to the variations. This signal was generated with the NIR measurement in the mixing circuit i.e. upstream of the column.

FIG. 2 shows a chromatogram of a 10 cm diameter HPLC-chromatography column on which the time course of the separation gradient after opening the bubble trap and allowing it to overflow is shown. This time course is reproducible and free of variations. This signal was generated with the NIR measurement in the mixing circuit i.e. upstream of the column.

Figure 3:
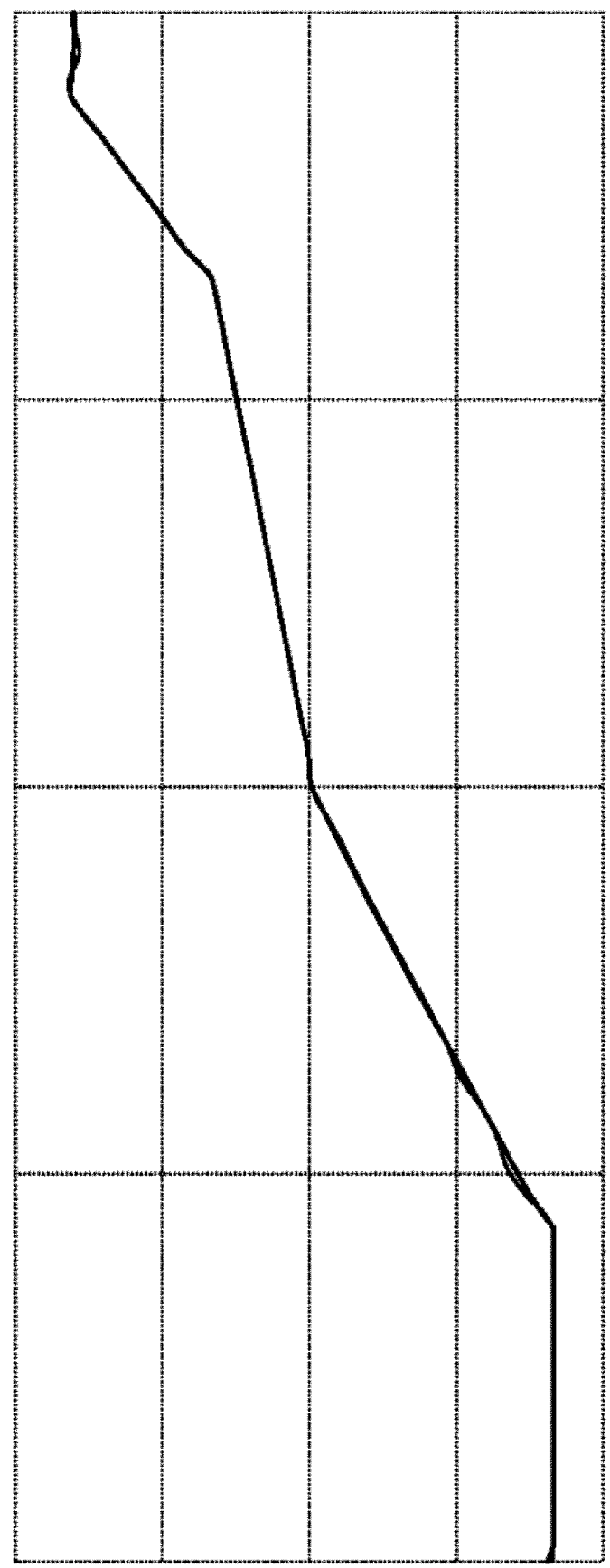

FIG. 3 shows superimposed gradients of a 10 cm and a 15 cm diameter HPLC-chromatography column after the bubble trap in the mixing circuit has been opened and allowed to overflow. Both time courses are comparable, reproducible and have few fluctuations (or are at least partially free of fluctuations). This signal was generated with the NIR measurement in the mixing circuit i.e. upstream of the column.

FIG. 4 shows a chromatogram of a 10 diameter HPLC-chromatography column on which the time course of a regeneration gradient after opening the bubble trap and allowing it to overflow, as described in the invention, is shown. The gradient peaks are reproducibly executed. This signal was generated with the NIR measurement in the mixing circuit i.e. upstream of the column.

A chromatogram of a 10 cm diameter chromatography column is shown in FIG. 5 on which the time course of a faulty regeneration gradient is shown. The gradient peaks are not well-executed. This chromatogram was generated on a HPLC system that was not operated in accordance with the invention. The signal was generated with the NIR measurement i.e. upstream of the column.

Figure 6:
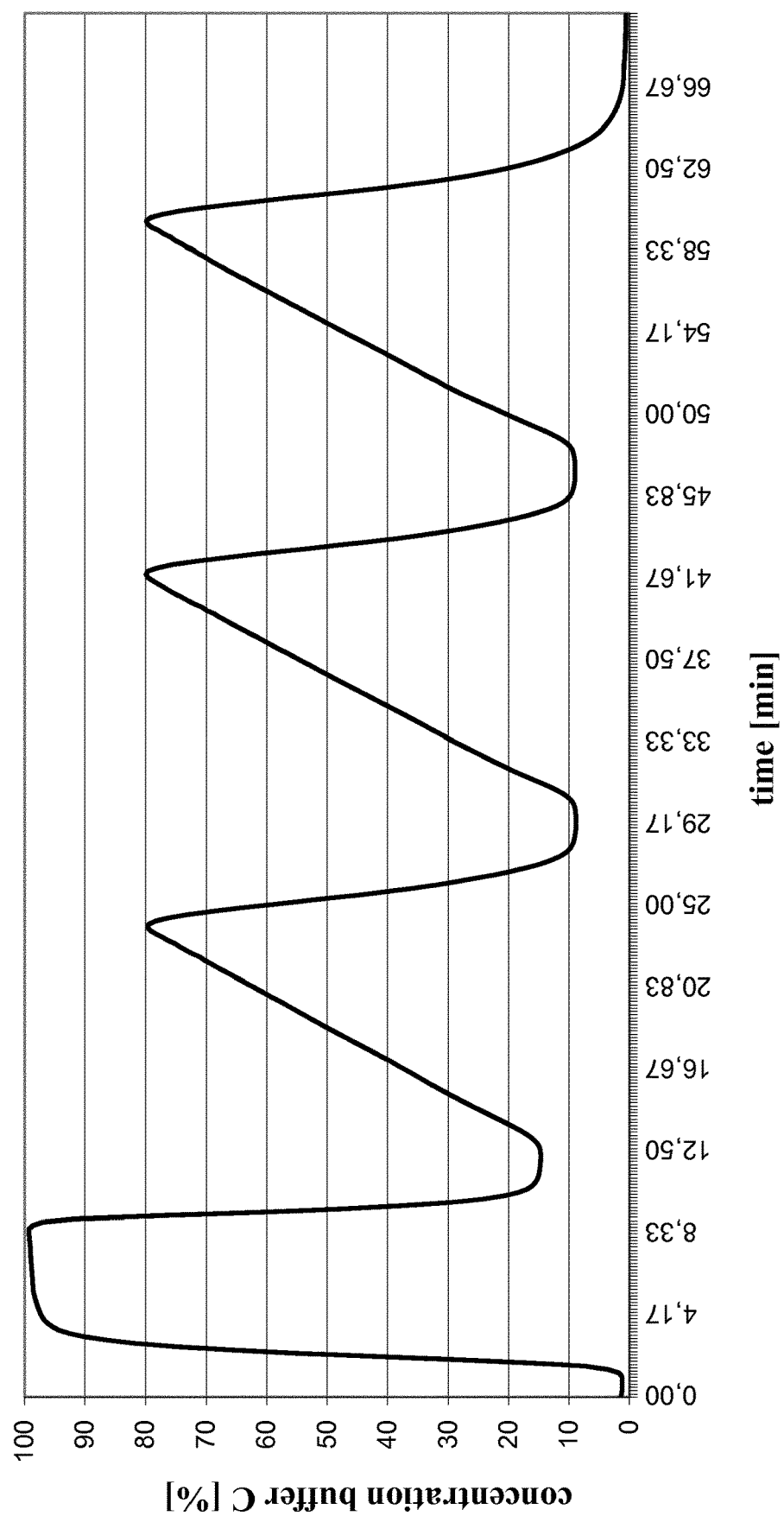

A regeneration chromatogram of an intact 15 cm diameter HPLC column is shown in FIG. 6. All three gradient peaks exhibit no distortions and are very comparable which indicates an intact column packing. This was subsequently confirmed by a conventional method. This signal was generated with the NIR measurement that was positioned downstream of the main pump and downstream of the column.

Figure 7:
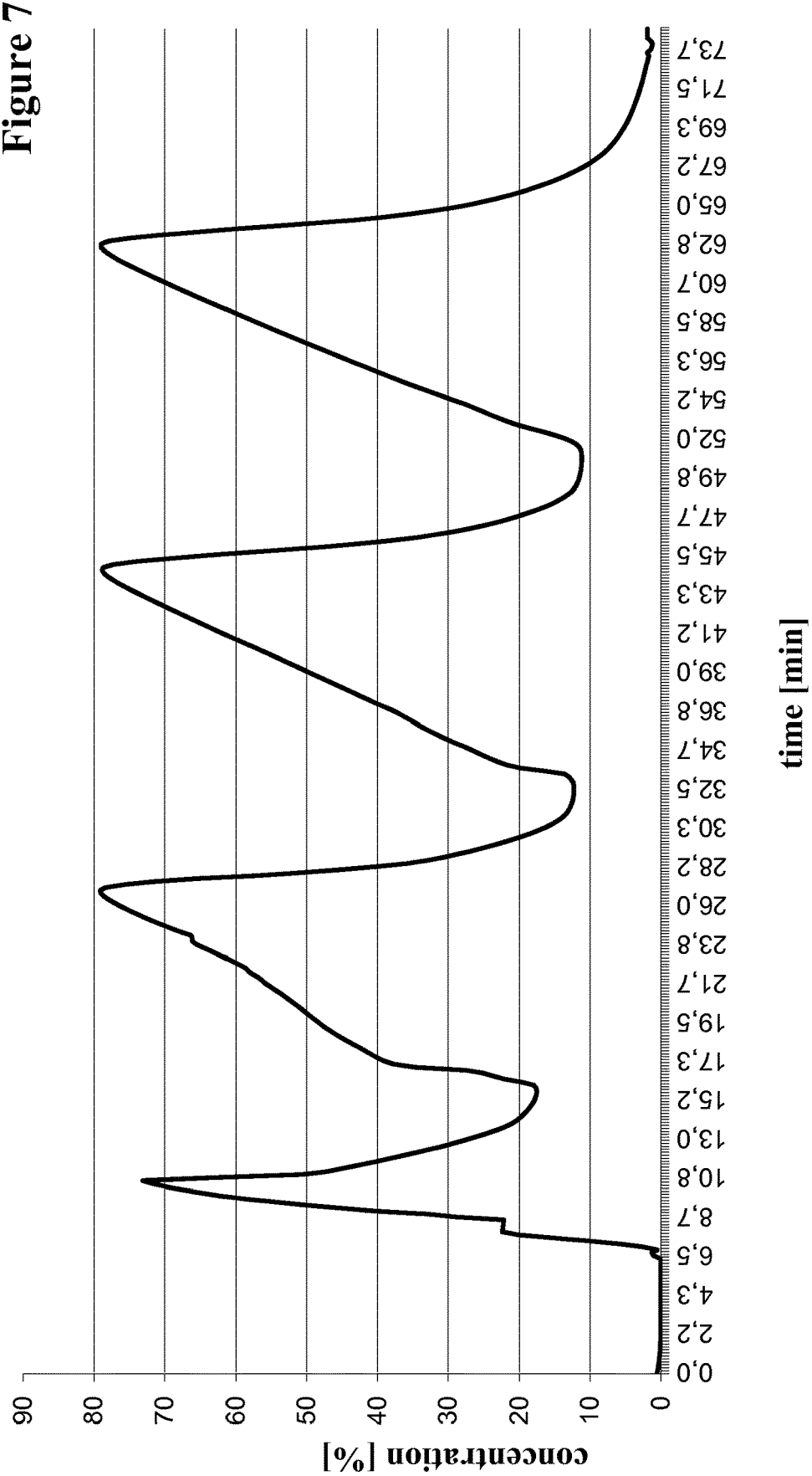

FIG. 7 shows a regeneration chromatogram of a defective 15 cm diameter HPLC column. A distortion of the ascending flank of the first gradient peak which is due to a crack in the column packing is clearly evident. The distortion is also seen in the NIR signal of the second gradient peak. The column defect that has thus been made visible was subsequently confirmed by a conventional determination of the packing quality by means of plate number determination and examination of the column matrix. This signal was generated with the NIR measurement that was positioned downstream of the main pump and downstream of the column.

Figure 8:
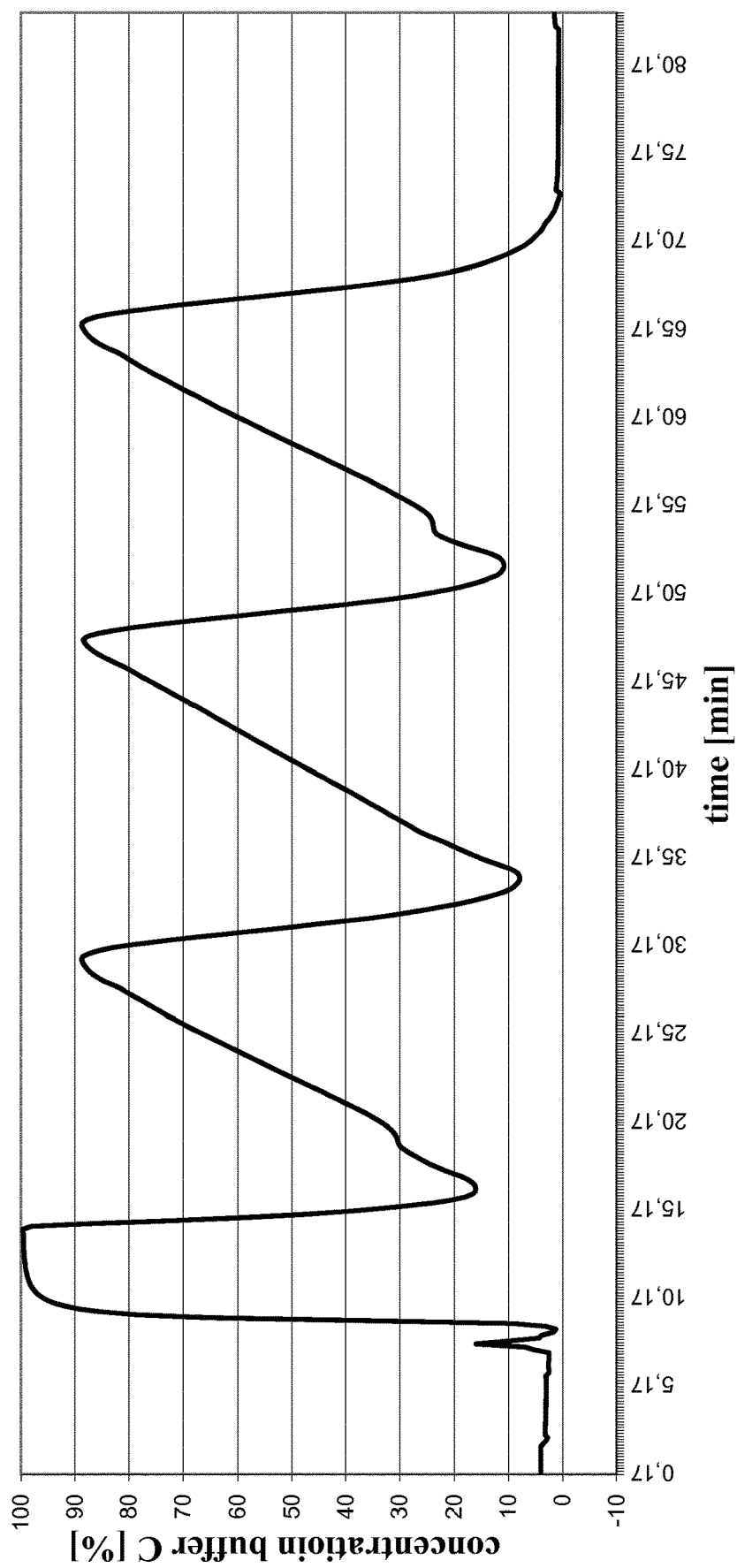

FIG. 8 shows a regeneration chromatogram of a defective 30 cm diameter HPLC column. In this case distortions in the gradient peaks are seen which indicate a column defect. The column defect was confirmed by a conventional method and examination of the column matrix. This signal was generated with the NIR measurement that was positioned downstream of the main pump and downstream of the column.

Figure 9:
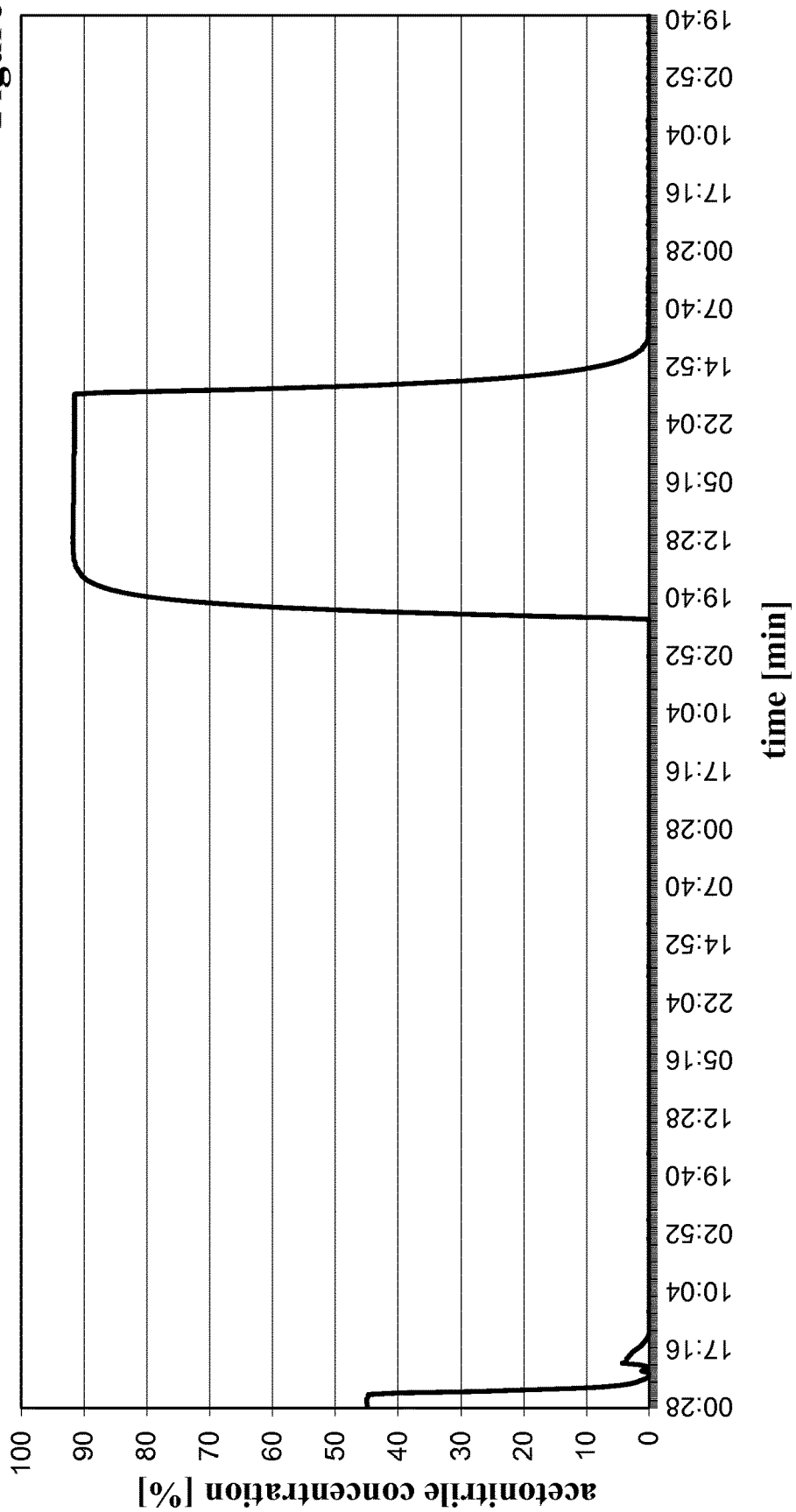

FIG. 9 shows an NIR signal of a solvent impulse before injection onto the HPLC column. The steep and non-deformed flanks of this peak are evident. This signal was generated with the NIR measurement that was positioned downstream of the main pump and downstream of the column.

Figure 10:
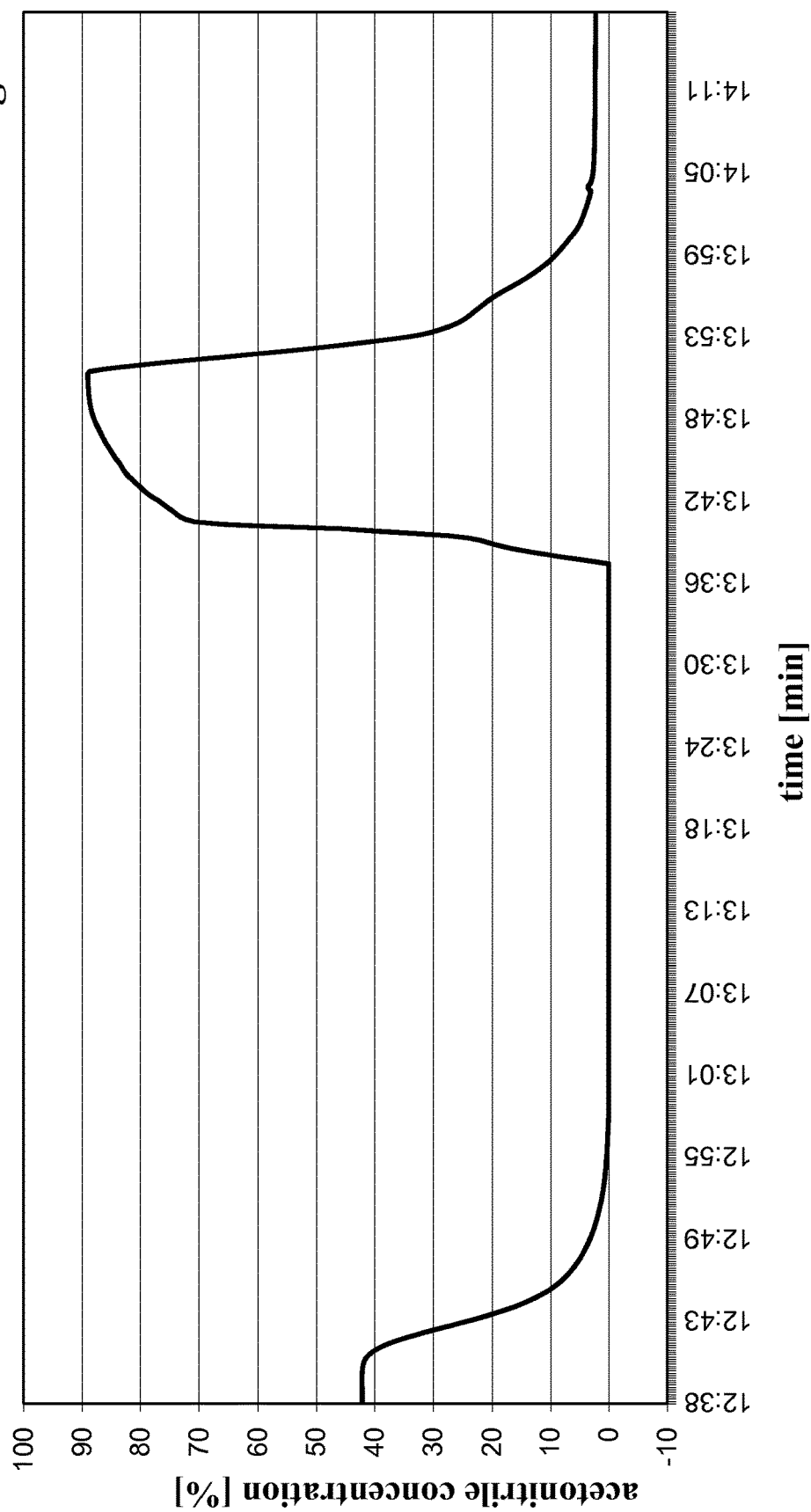

A solvent peak (cf. the ideal peak in FIG. 9) is shown in FIG. 10 after it has passed a damaged column packing. The distortions in the two flanks of the peak which are due to defects in the column packing are clearly seen. The defective packing quality was confirmed by a conventional method. This signal was generated with the NIR measurement that was positioned downstream of the main pump and downstream of the column.

Figure 11:
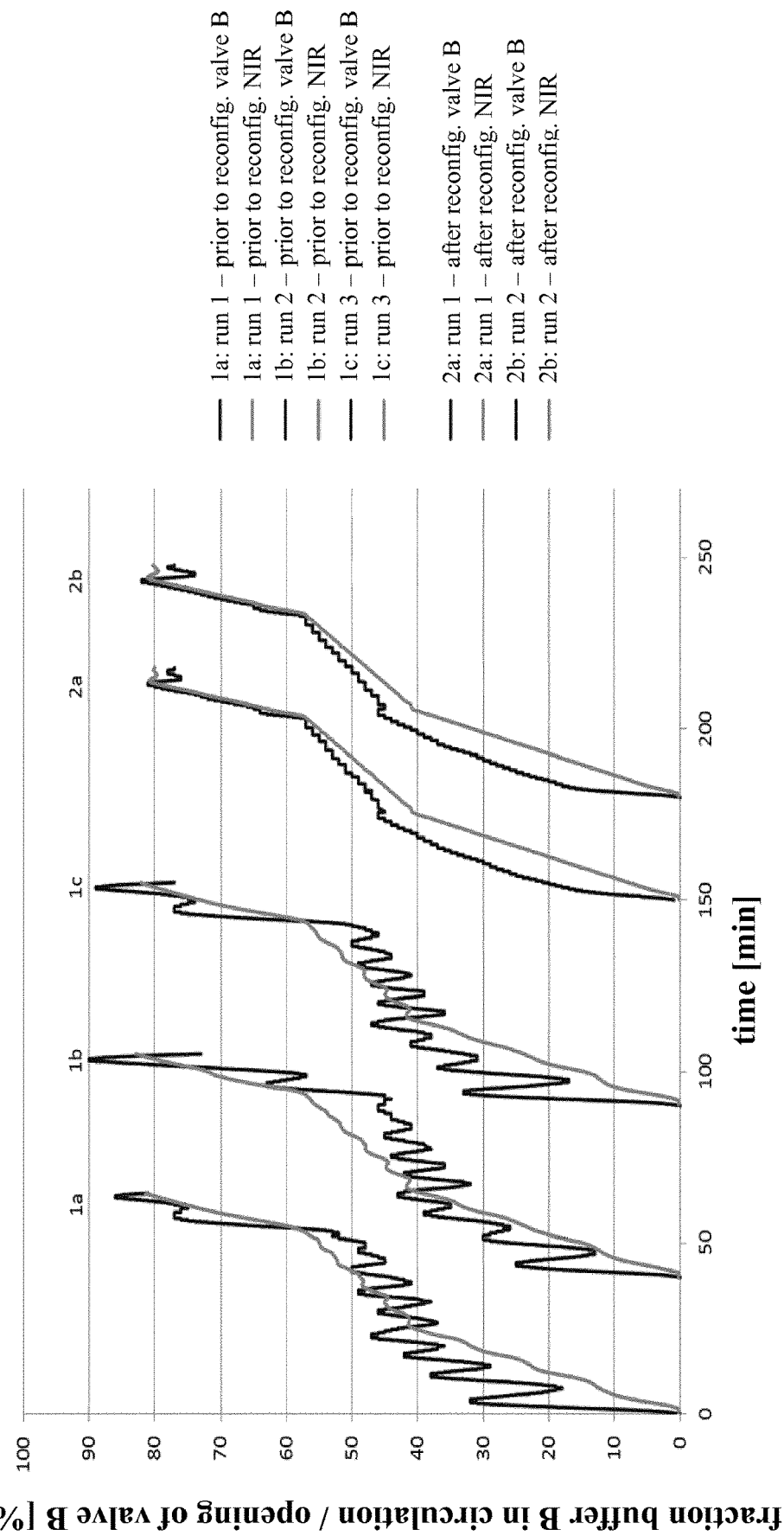

In FIG. 11 three gradient time courses of a 10 cm diameter HPLC column are shown on the left which were obtained in a system that was not modified according to the invention. The fluctuations in the degree of opening of the acetonitrile valve which are in some cases considerable and consequently also those of the gradient can be clearly seen. The two time courses on the right were obtained in a system that was reconfigured in the sense of the invention i.e. with a separated and overflowed bubble trap. The very reproducible gradient time courses and degrees of opening of the acetonitrile valve are clearly seen without distinct fluctuations. These signals were generated only with the NIR measurement in the mixing circuit.

Figure 12:
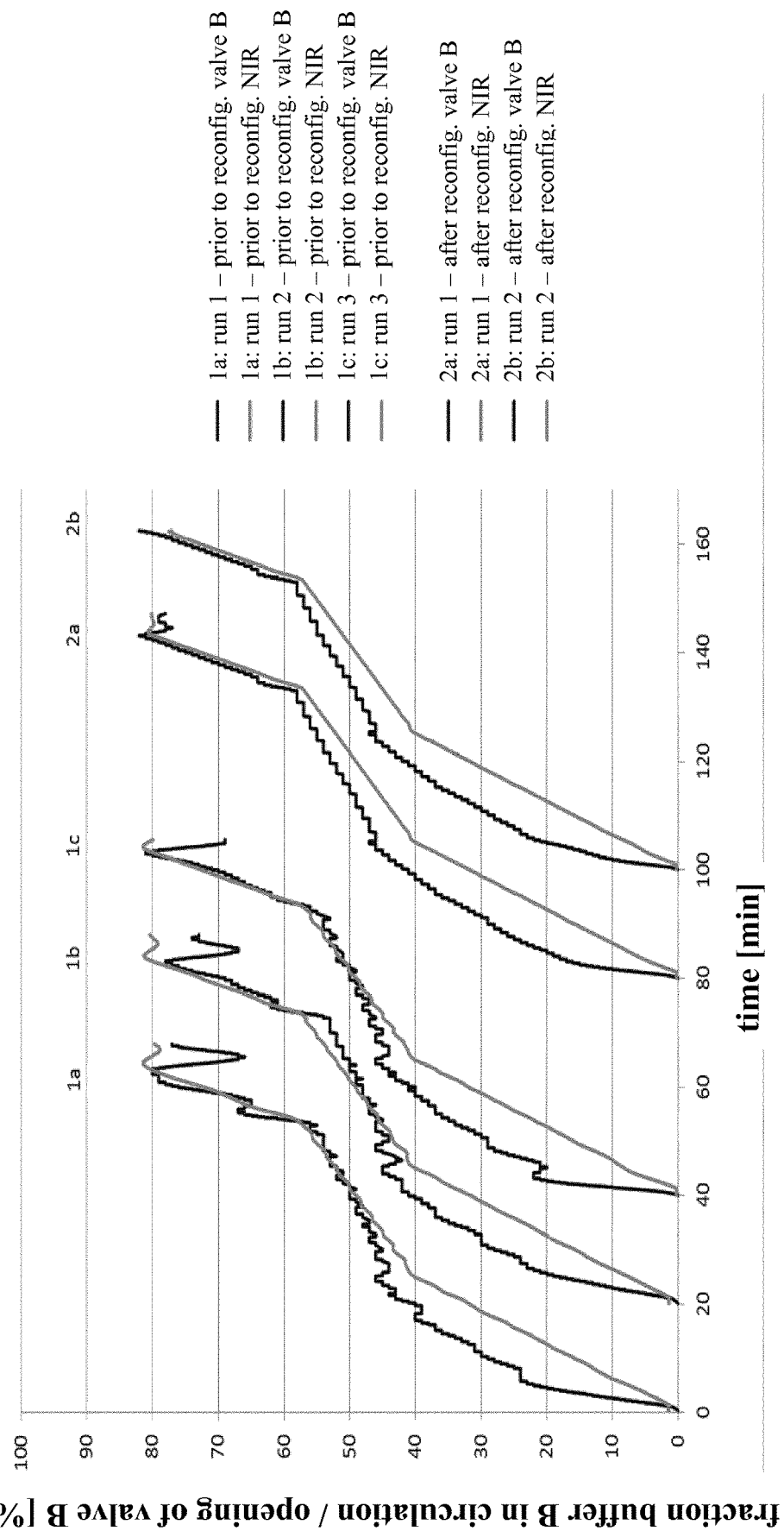

In FIG. 12 three gradient time courses of the 15 cm diameter HPLC column are shown on the left which were obtained with conventional systems. In this case fluctuations of the degree of opening of the acetonitrile valve which are in some cases considerable and consequently also of the gradient are seen which are less than those of the 10 cm dimension. The two time courses on the right side were obtained in a system that has been reconfigured in accordance with the invention i.e. with a separated and overflowed bubble trap. The very reproducible gradient time courses and degrees of opening of the acetonitrile valve without fluctuations are clearly seen. These signals were generated with the NIR measurement in the mixing circuit i.e. upstream of the column.

In FIG. 13 three gradient time courses of the 15 cm diameter HPLC column are shown on the left and three gradient time courses of the 10 cm diameter HPLC column are shown on the right which were obtained in a conventional system. The non-reproducible and varying gradient time courses and degrees of opening of the acetonitrile valve are clearly seen with both dimensions. These signals were generated with the NIR measurement in the mixing circuit i.e. upstream of the column.

Figure 14:
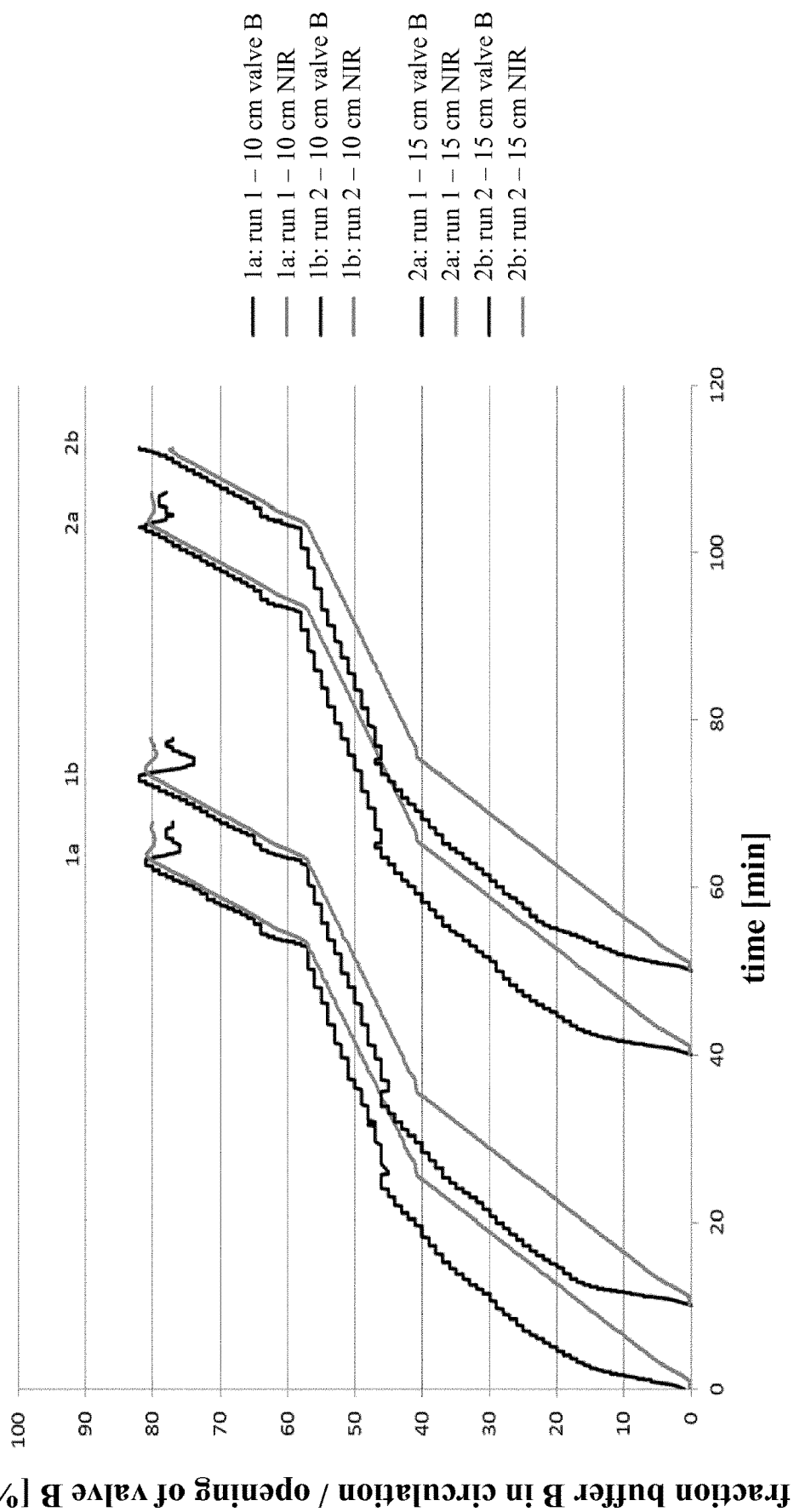

In FIG. 14 two gradient time courses of the 15 cm diameter HPLC columns are shown on the left and two gradient time courses of the 10 cm diameter HPLC column are shown on the right which were obtained in a system according to the invention i.e. with a bubble trap separated from the mixing circuit and which was overflowed. The reproducible and almost identical gradient time courses and degrees of opening of the acetonitrile valve are seen with both dimensions. These signals were generated with the NIR measurement in the mixing circuit i.e. upstream of the column.

Figure 15:
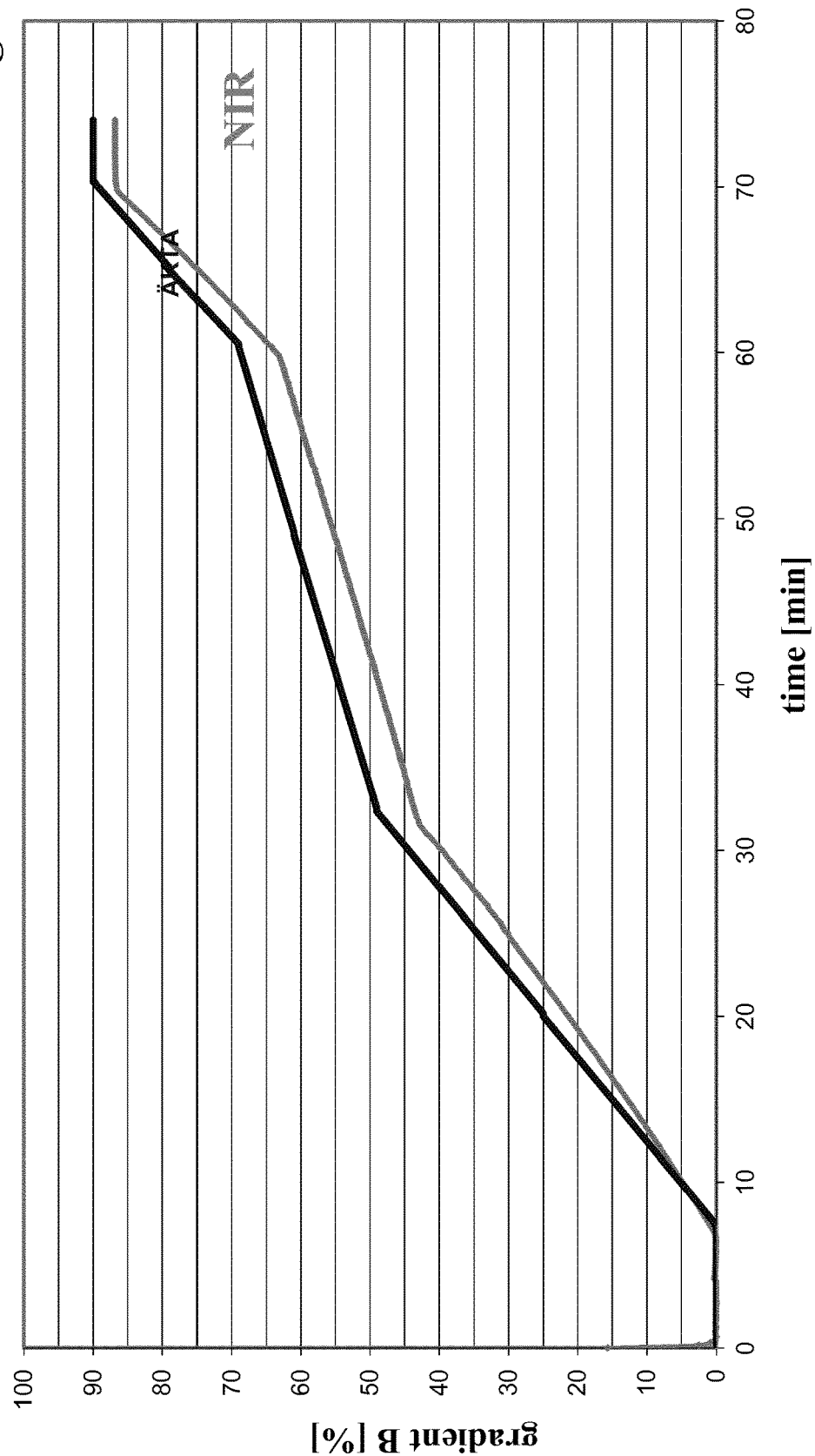

Two different gradient time courses that were recorded on an Äkta HPLC system are seen in FIG. 15. The signal ÄKTA was formed from the transfer of the performance data of the gradient pump that were used to program the system. NIR programming values of a preparative HPLC system that differed considerably from the Äkta-HPLC system with regard to design and dimension were used as a basis to program the Äkta-HPLC system which cannot be programmed with NIR values. The time courses of both gradients on the Äkta-HPLC system, in one case performance data of the gradient pump and in one case the actual measured NIR values after the mixing chamber, were plotted and shown in a diagram taking into consideration a common starting point. A considerable difference in the time courses of both gradients is seen although identical time courses should result according to the programming. This diagram shows that the transfer of a gradient between systems of different designs and dimensions is not directly possible without deviations if one does not utilize or take into consideration an additional NIR signal downstream of the mixing circuits or mixing chambers.

Figure 16:
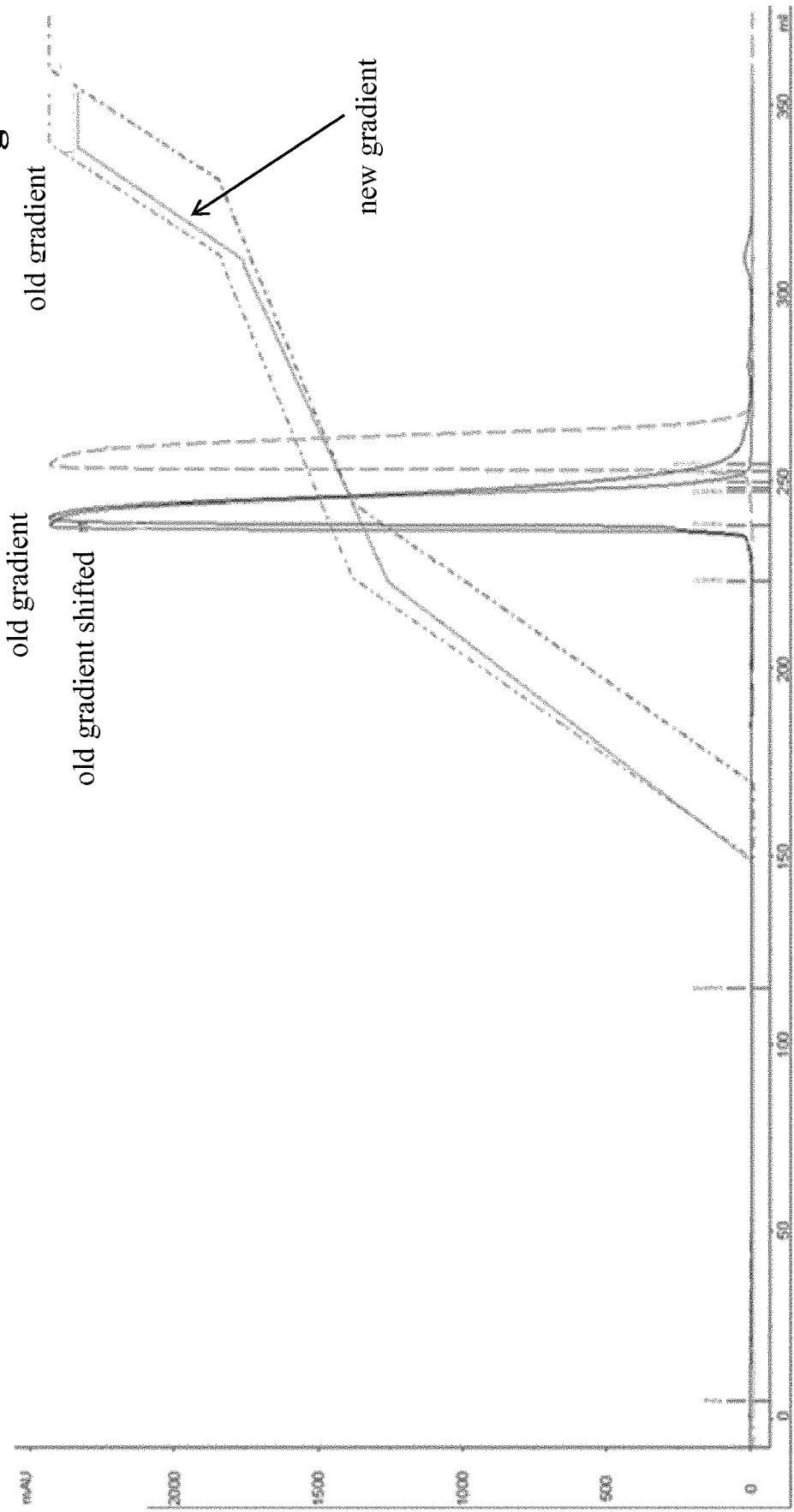

Superimposed chromatograms are shown in FIG. 16 which were generated with an Äkta-HPLC system. Two peaks of different widths and shapes are clearly seen. These peaks were formed with two differently programmed gradients before and after taking into consideration the actual NIR measurement downstream of the mixing chamber of the system. A better agreement and transferability of the separation time courses of the process system and of the Äkta-HPLC system were achieved after correction of the Äkta gradient (adaptation to the productive system).

Figure 17:
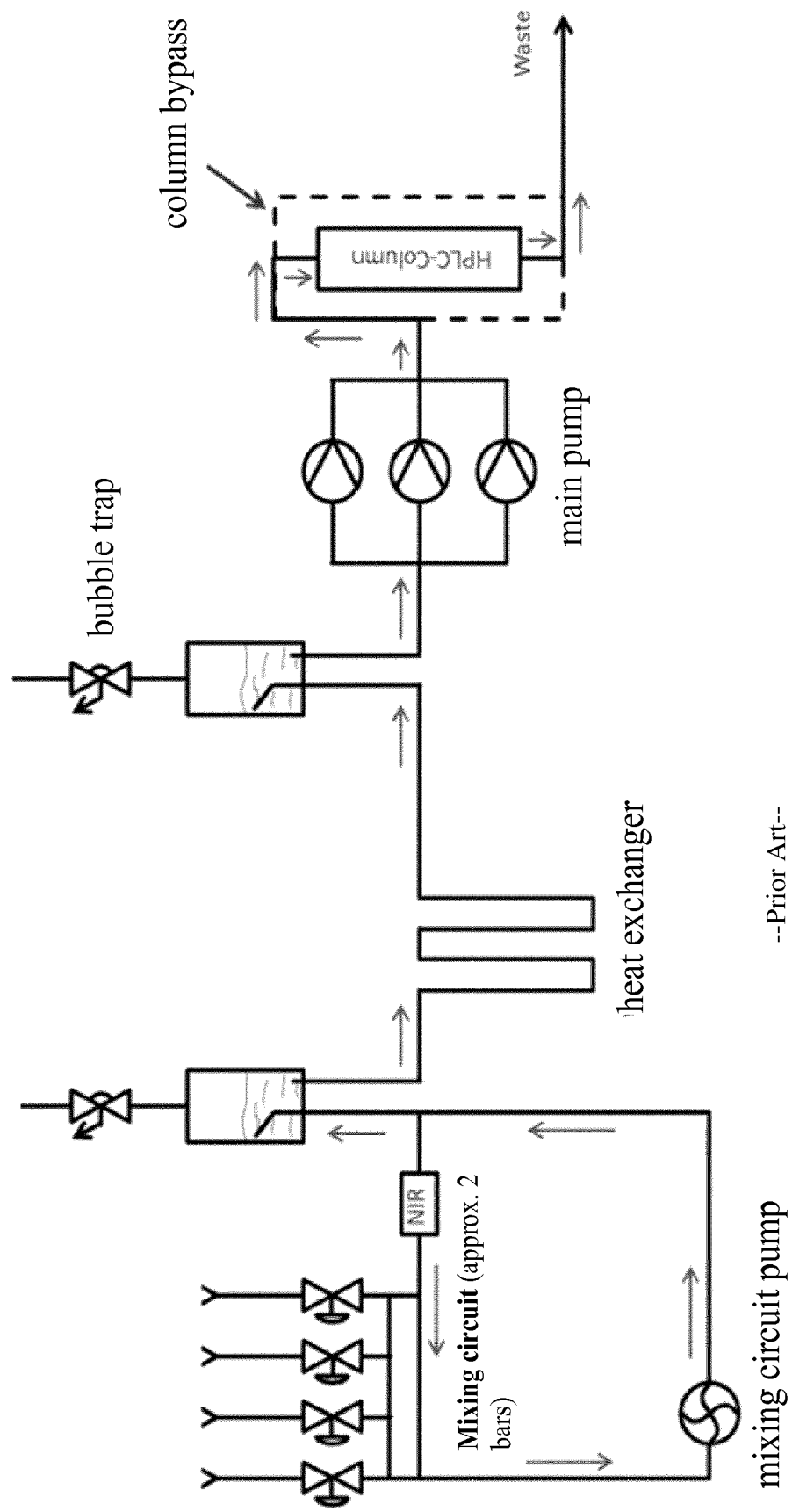

A schematic layout of a conventional preparative HPLC system which is equipped with a pressurized bubble trap is shown in FIG. 17. There is no shutoff device (valve) between the bubble trap and the mixing circuit. It is not possible to divide the flow in the bubble trap or to degas the eluents. Also it is not possible to identically execute gradients that run in different dimensions. The circulation rate in the mixing circuit is constant. The system only has one NIR measurement which is positioned in the mixing circuit. Hence, it is not possible to check the column and gradient quality online.

Figure 18:
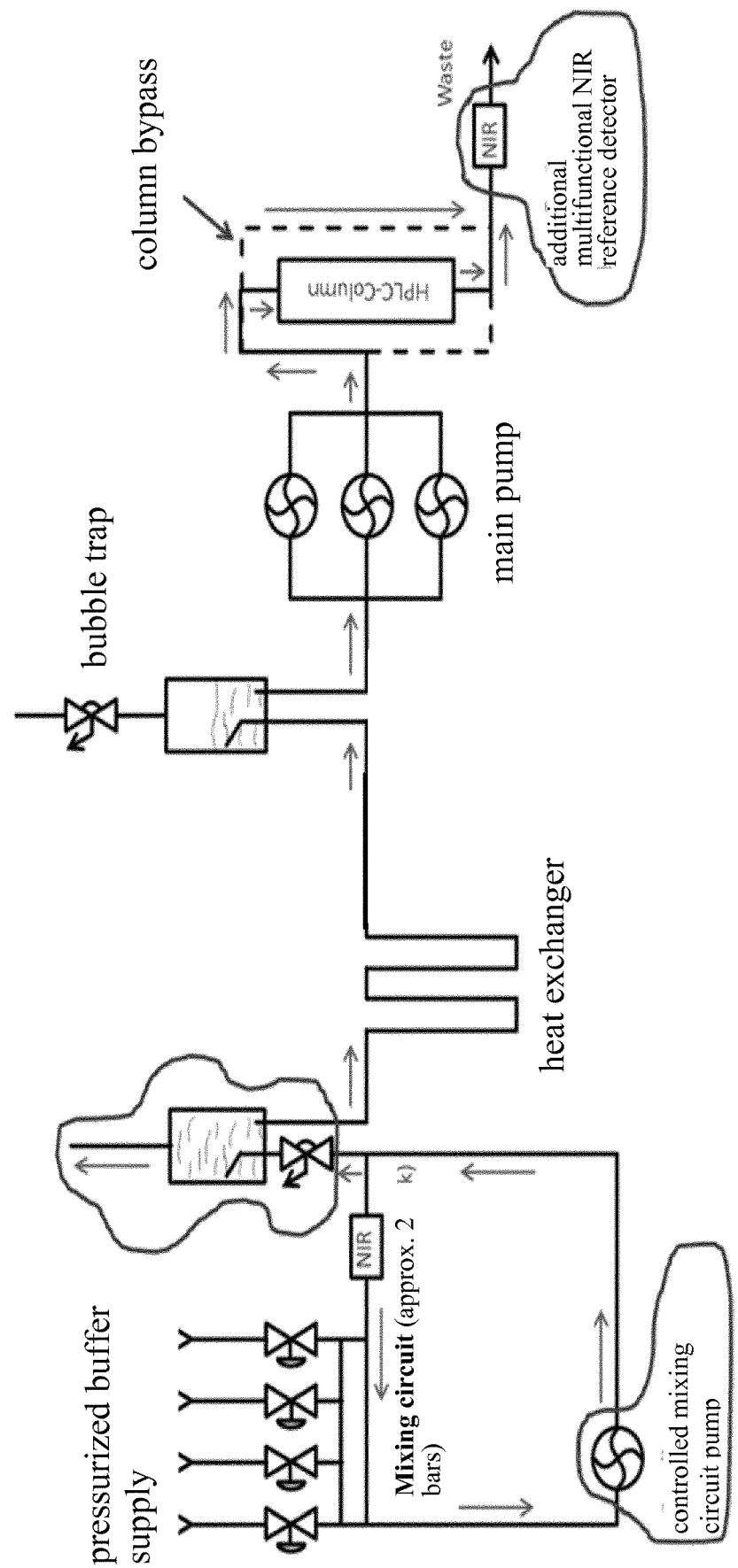

FIG. 18 shows a schematic layout of a preparative HPLC system modified according to the invention which is equipped with a bubble trap that is separated from the mixing circuit and is not under pressure or can be operated under a much lower pressure than that present in the mixing circuit. An adjustable shutoff device (e.g. a valve) is located between the bubble trap and mixing circuit. An adjustable shutoff device (e.g. a valve) can optionally be installed at the upper outlet of the bubble trap. The flow can be divided in the bubble trap and the degassing of the eluents takes place there. It is also possible to run identical gradients which proceed in different column dimensions. The circulation rate in the mixing circuit can be variably adjusted. The system has two NIR measuring positions one in the mixing circuit and one downstream of the main pump. It is possible to check the column quality as well as the gradient quality online in the column bypass mode.

Figure 19:
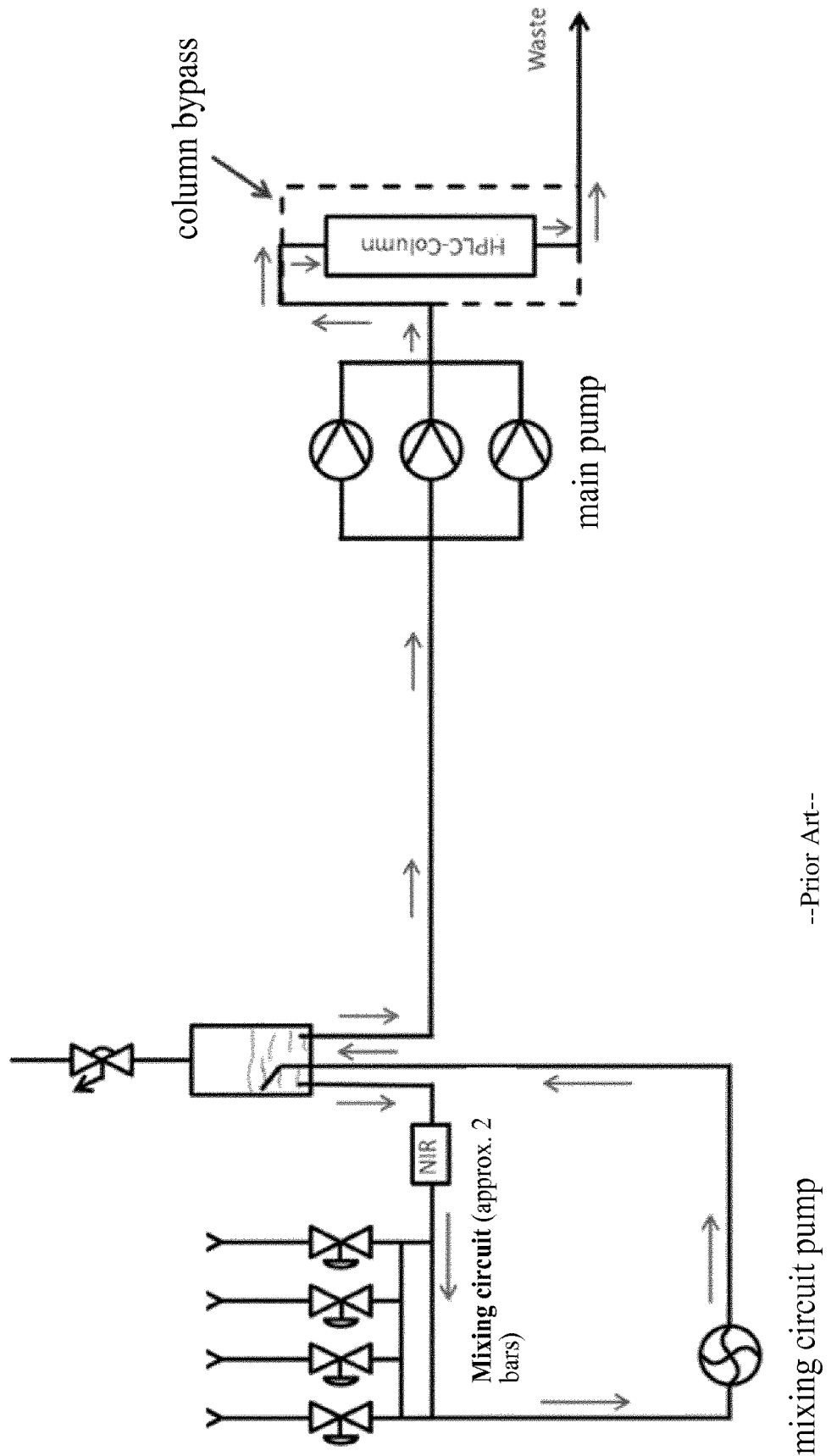

A schematic layout of a conventional preparative HPLC system is shown in FIG. 19 which has a bubble trap that is under pressure and integrated into the mixing circuit. There is no shutoff device between the bubble trap and the mixing circuit. It is neither possible to divide the flow in the bubble trap nor to degas the eluents and it is also not possible to identically run gradients which proceed in different dimensions. The circulation rate in the mixing circuit is constant. The system only has one NIR measurement point which is positioned in the mixing circuit. It is not possible to check the column and gradient quality online.

Figure 20:
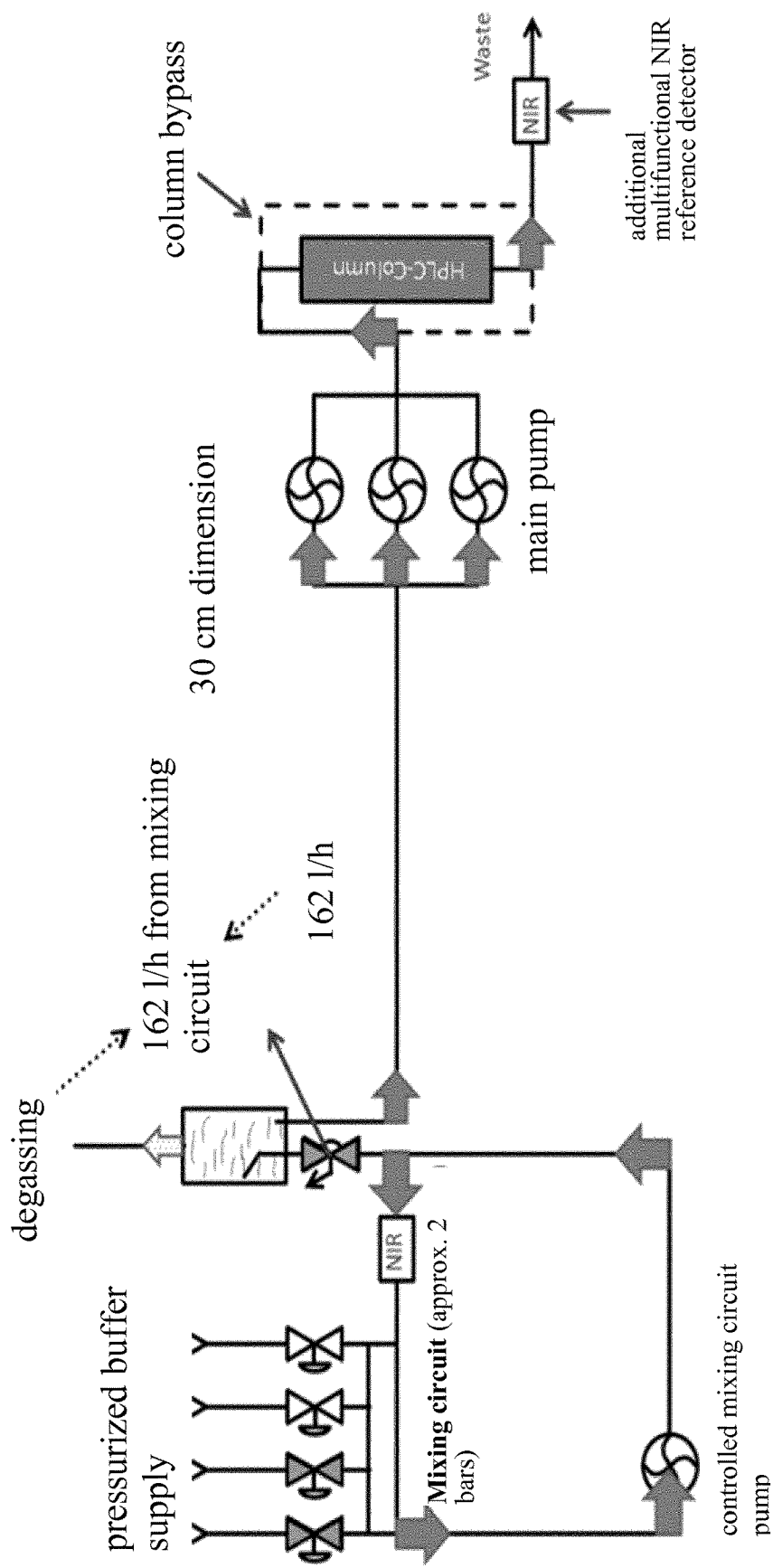

An example of a preparative HPLC system modified in the sense of the invention is shown in FIG. 20 which has a bubble trap that is separated from the mixing circuit and can be operated unpressurized. An adjustable shutoff device (e.g. a valve) is located between the bubble trap and the mixing circuit. This example is the largest dimension for which the system is designed. Thus, only the degassing of the eluents takes place in the bubble trap. It is not necessary to divide the flow but it is optionally possible. The circulation rate in the mixing circuit can be adjusted in a flexible manner. The system has two NIR measuring positions, one of which is positioned in the mixing circuit and the other downstream of the main pump. Hence, it is possible to check the column and gradient quality online.

Figure 21:
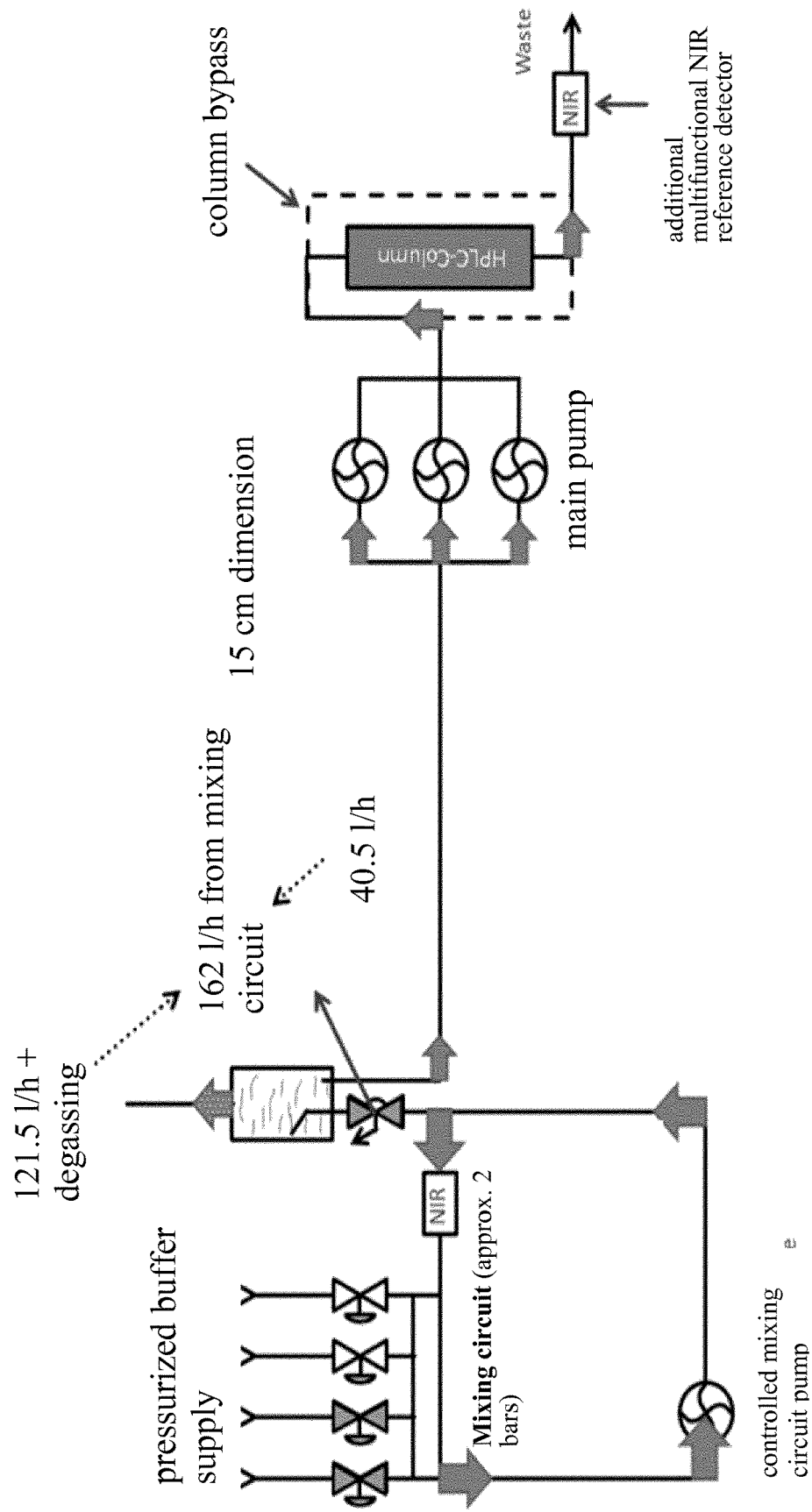

An example of a preparative HPLC system modified in the sense of the invention is shown in FIG. 21 which has a bubble trap that is separated from the mixing circuit and can be operated unpressurized. An adjustable shutoff device (e.g. a valve) is located between the bubble trap and the mixing circuit. In this case it is the middle process variant which means that the degassing of the eluents as well as a flow division takes place in the bubble trap. The flow division ensures that the gradient that was also used in the largest dimension (see FIG. 21) is carried out in an identical manner. The sum of the flow which is passed towards the column and that which leaves the system through the bubble trap is the same as the process flow of the largest dimension. The circulation rate in the mixing circuit can be variably adjusted. The system has two NIR measuring positions, one of which is positioned in the mixing circuit and the other downstream of the main pump. Hence, it is possible to check the column and gradient quality online.

Figure 22:
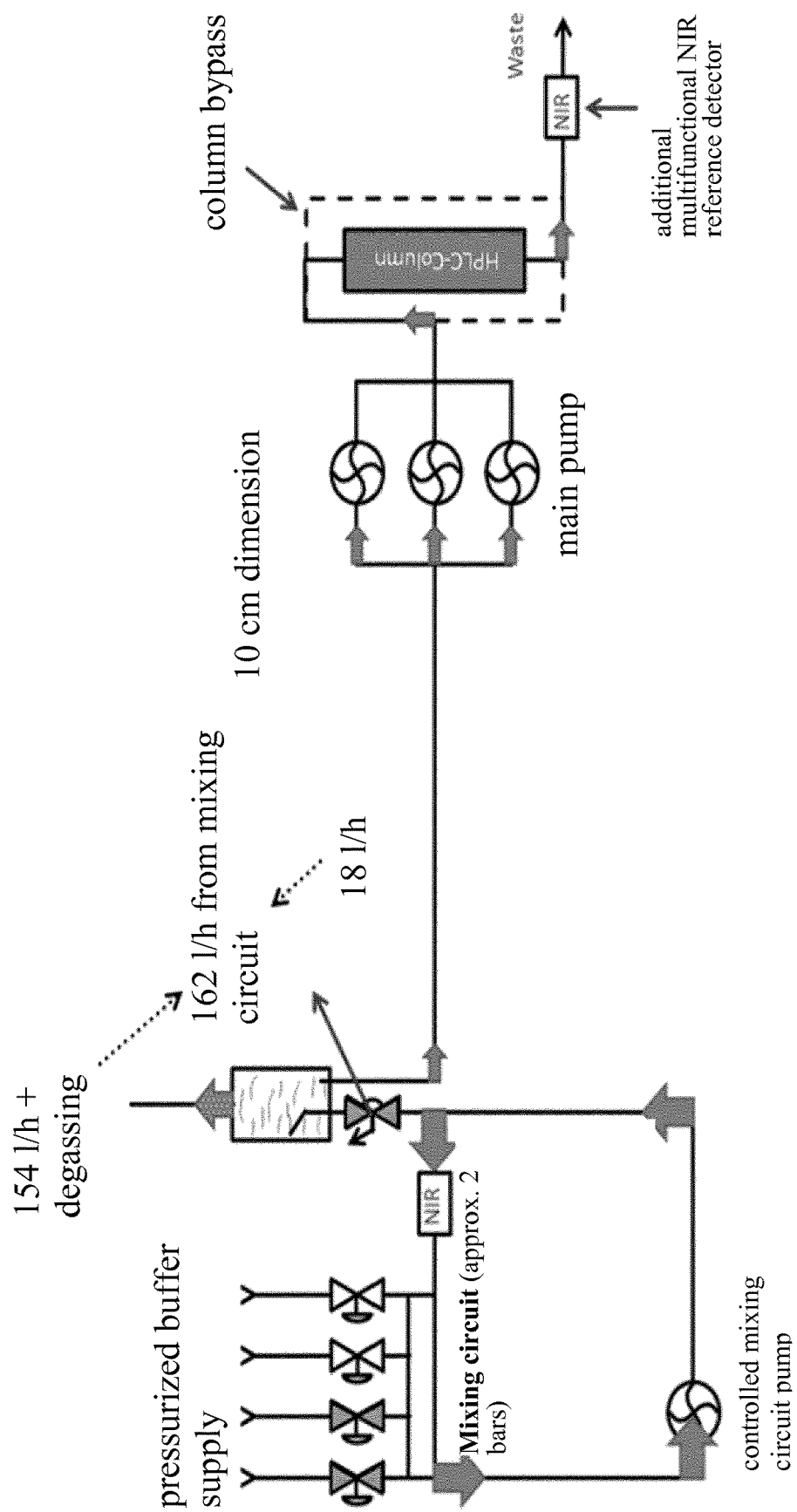

An example of a preparative HPLC system modified in the sense of the invention is shown in FIG. 22 which has a bubble trap that is separated from the mixing circuit and can be operated unpressurized. An adjustable shutoff device (e.g. a valve) is located between the bubble trap and the mixing circuit. In this case it is the smallest process variant which means that the degassing of the eluents as well as a flow division takes place in the bubble trap. The flow division ensures that the gradient that was also used in the largest and in the middle dimension can be carried out identically. The sum of the flow which is passed towards the column and that which leaves the system via the bubble trap is equal to the process flow of the largest dimension. The circulation rate in the mixing circuit can be variably adjusted. The system has two NIR measuring positions, one of which is positioned in the mixing circuit and the other downstream of the main pump. Hence, it is possible to check the column and gradient quality online.

Figure 23:
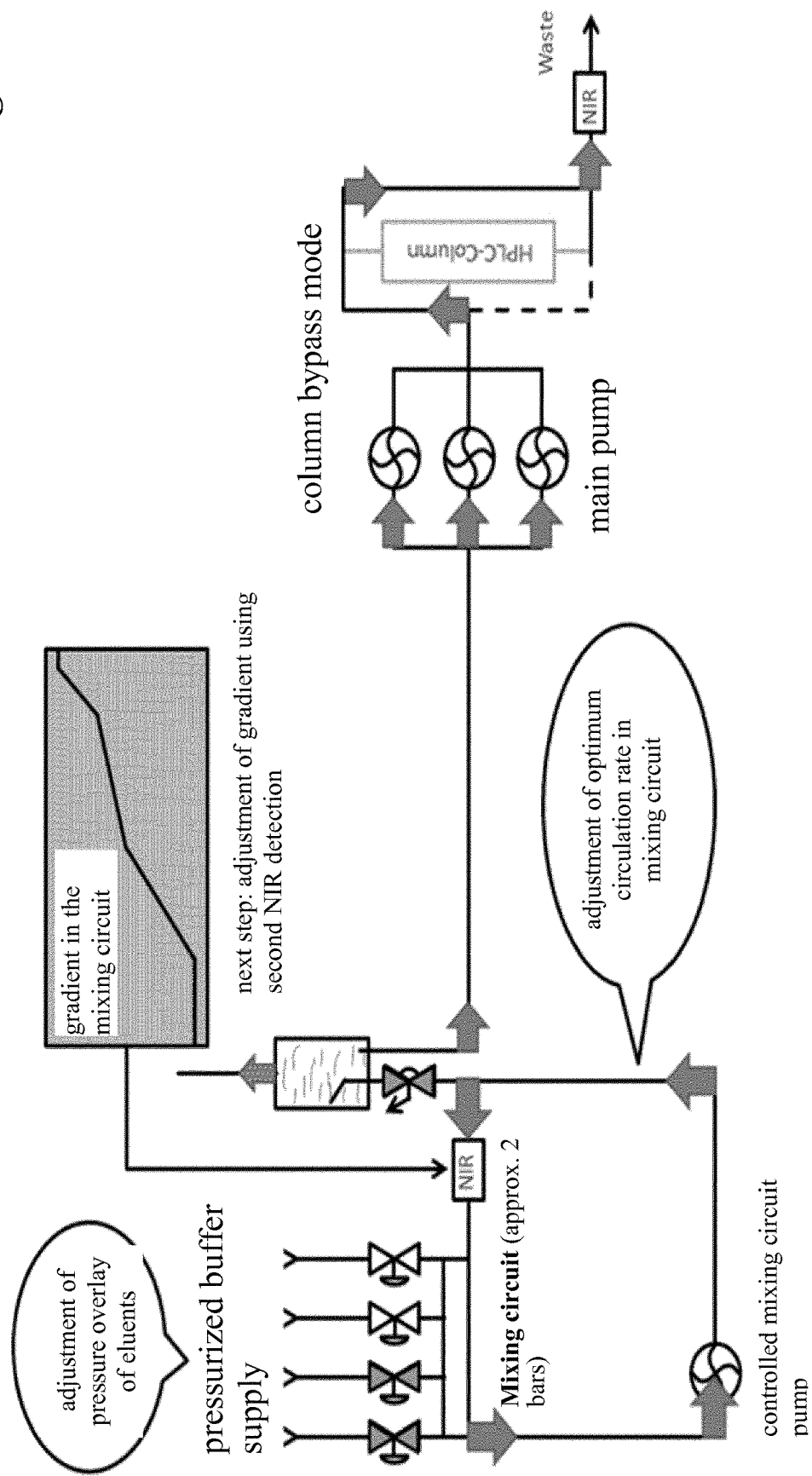

FIG. 23 shows the procedure for setting an optimal gradient time course as an example using a preparative HPLC system modified in the sense of the invention that has a bubble trap which is separated from the mixing circuit and can be operated while not under pressure. An adjustable shutoff device (e.g. a valve) is located between the bubble trap and the mixing circuit. The circulation rate in the mixing circuit can be adjusted in a flexible manner. The system has two NIR measuring positions, one of which is positioned in the mixing circuit and the other is positioned downstream of the main pump. Hence, it is possible to check the column and gradient quality online. This diagram illustrates that the first step in setting an optimal gradient is the correct adjustment of all required parameters in the mixing circuit and in the area of the buffer supply. The parameters have been successfully adjusted when the NIR measurement that takes place in the mixing circuit reflects the optimal target state of the gradient at this position. In this case the adjustment parameters are among others the following: the pressure overlay of the buffer vessels and the adjustment of the optimal circulation rate in the mixing circuit.

Figure 24:
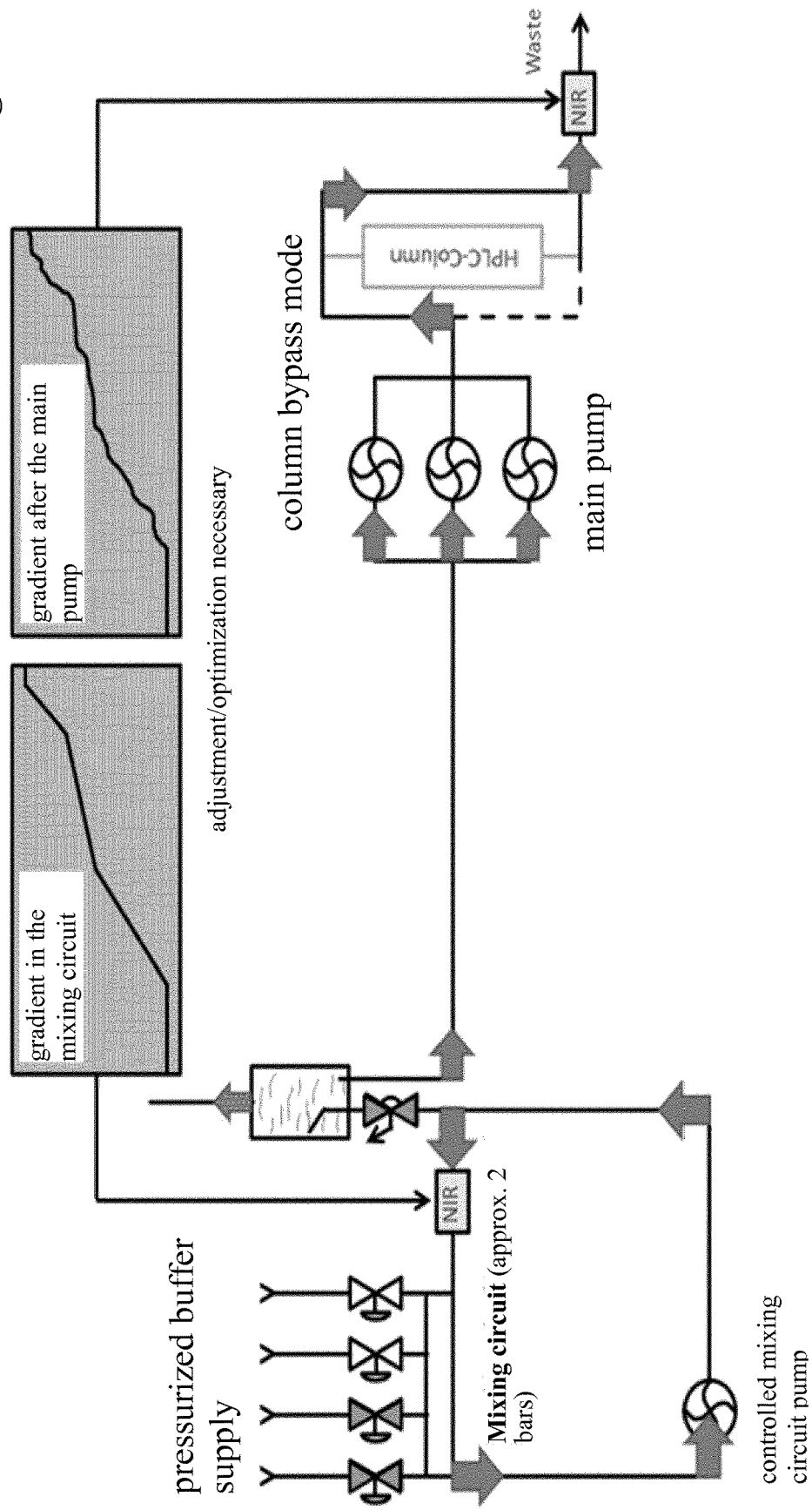

FIG. 24 shows an example of the procedure for setting an optimal gradient time course using a preparative HPLC system modified in the sense of the invention that has a bubble trap which is separated from the mixing circuit and can be operated while not under pressure. An adjustable shutoff device (e.g. a valve) is located between the bubble trap and the mixing circuit. The circulation rate in the mixing circuit can be adjusted in a variable manner. The system has two NIR measuring positions, one of which is positioned in the mixing circuit and the other is positioned downstream of the main pump. Hence, it is possible to check the column and gradient quality online. This diagram illustrates that the second step in adjusting an optimal gradient is the alignment with the second downstream NIR measurement after the correct flow dimension is taken from the main pump of the system. In this case considerable differences between the two gradients are evident that have to be eliminated by adaptation measures.

Figure 25:
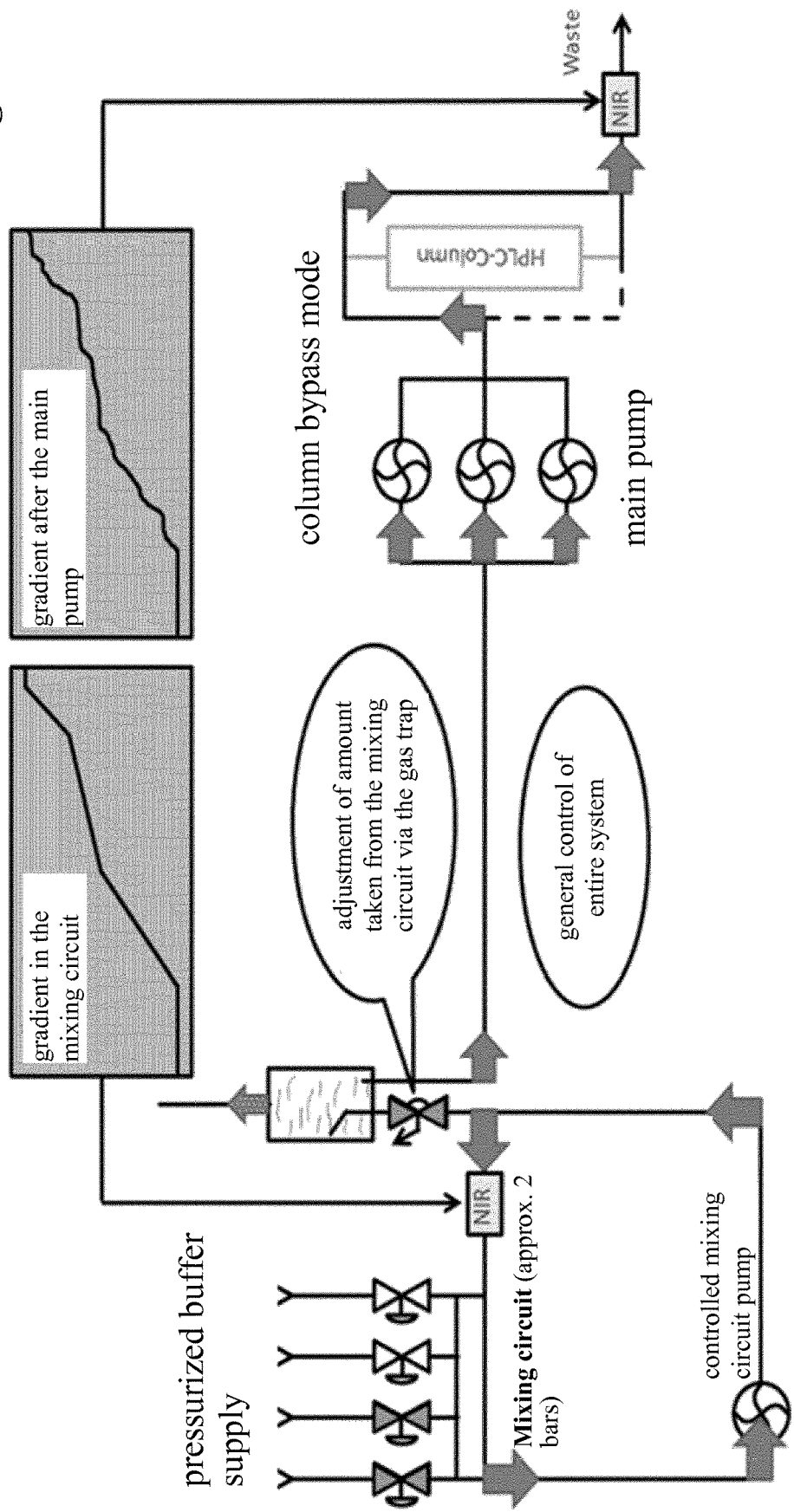

FIG. 25 shows an example of the procedure for setting an optimal gradient time course using a preparative HPLC system modified in the sense of the invention which has a bubble trap that is separated from the mixing circuit and can be operated while not under pressure. An adjustable shutoff device (e.g. a valve) is located between the bubble trap and the mixing circuit. The circulation rate in the mixing circuit can be adjusted in a variable manner. The system has two NIR measuring positions, one of which is positioned in the mixing circuit and the other is positioned downstream of the main pump. Hence, it is possible to check the column and gradient quality online. This diagram illustrates that the next step in adjusting an optimal gradient comprises the following measures: optimal adjustment of the amount taken from the mixing circuit e.g. via the adjustable valve which is located between the bubble trap and the mixing circuit, optimal adjustment of the flow quantity that leaves the system via the bubble trap at its highest point, and the general checking of all system components.

Figure 26:
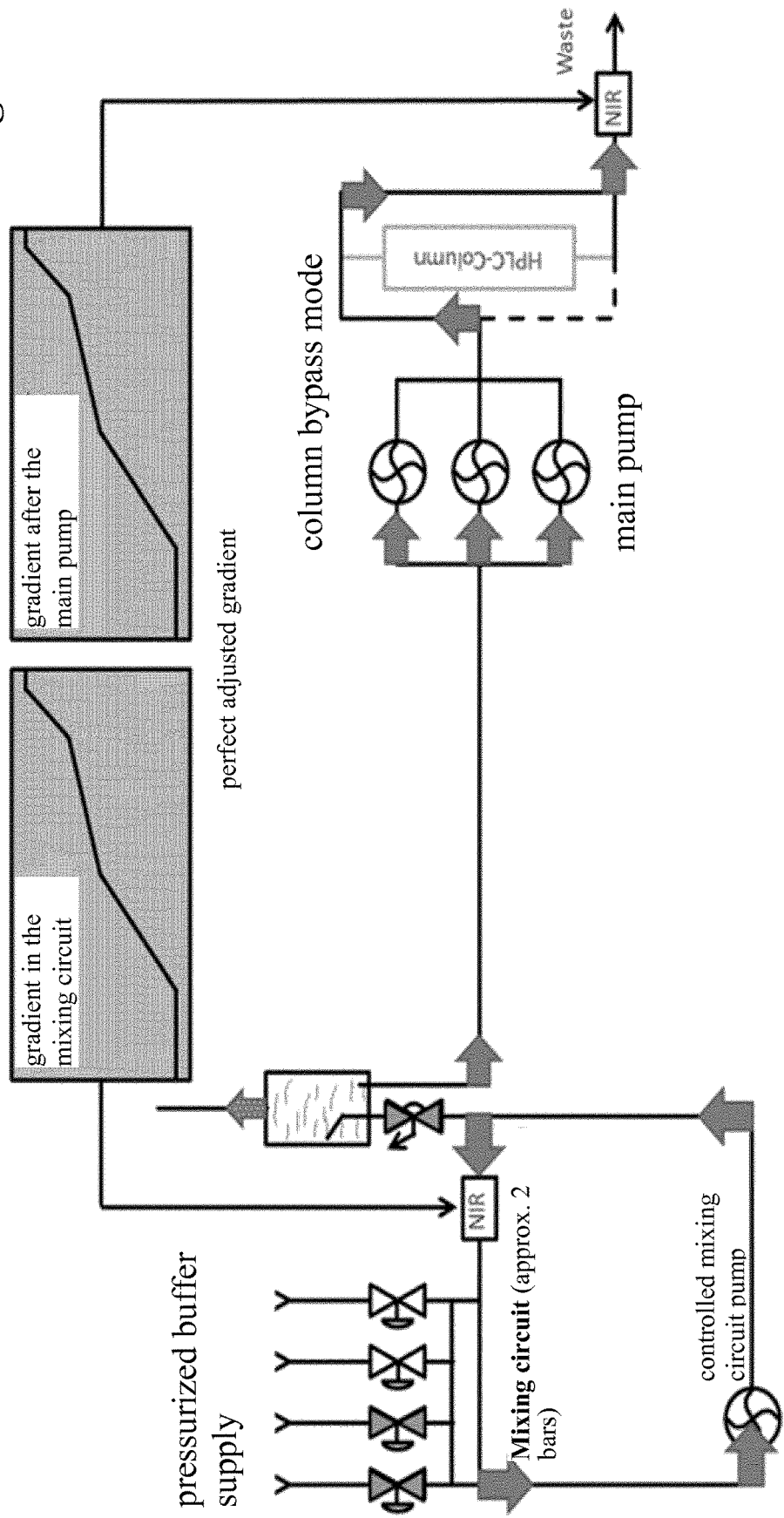

FIG. 26 shows an example of the procedure for setting and continuously monitoring an optimal gradient time course using a preparative HPLC system modified in the sense of the invention which has a bubble trap that is separated from the mixing circuit and can be operated while not under pressure. An adjustable shutoff device (e.g. a valve) is located between the bubble trap and the mixing circuit. The circulation rate in the mixing circuit can be adjusted in a variable manner. The system has two NIR measuring positions, one of which is positioned in the mixing circuit and the other is positioned downstream of the main pump. Hence, it is possible to check the column and gradient quality online. This diagram illustrates that after successfully setting all system parameters, both gradients which are detected in the mixing circuit and downstream of the main pump, are identical. When this state has been reached, the adaptation process is completed and the values that have been determined can be used to permanently program the system. From this time onwards the quality of the gradient is continuously monitored in the column bypass mode by means of the additional NIR measurement. For this purpose test runs without the column or in the column bypass mode are carried out at regular intervals. This ensures that the system has no adverse effects on the HPLC columns that are used. Equally deviations are rapidly detected and can be eliminated.

Figure 27:
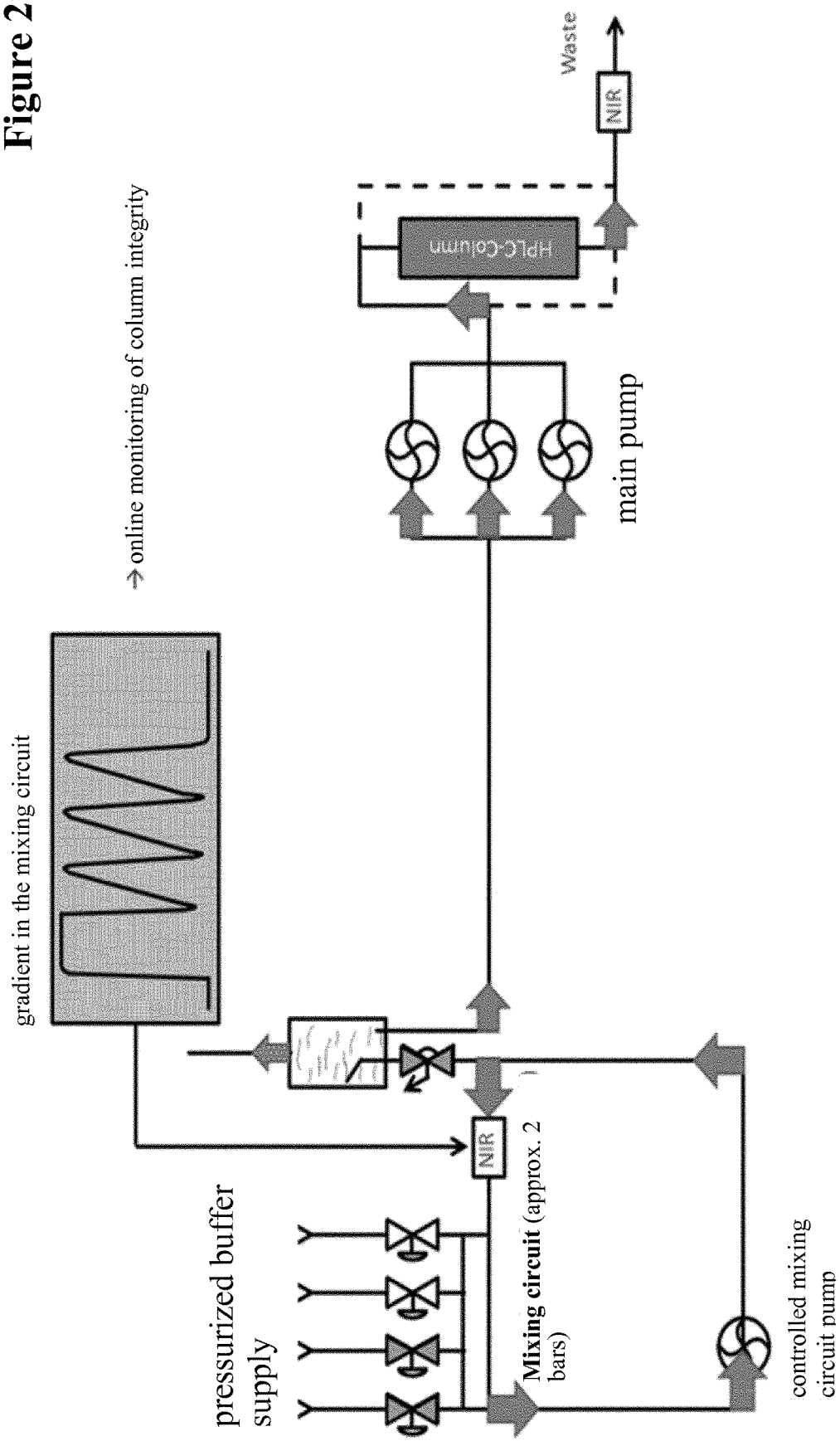

FIG. 27 shows an example of the procedure for checking the quality of the HPLC columns that are used, using a HPLC system that has a second NIR measurement downstream of the main pump. This additional NIR measurement can take place by means of an appropriate bypass either upstream of the column or downstream of the column. The first NIR measurement takes place upstream of the main pump. Hence, it is possible to check the column and gradient quality online. This diagram illustrates that the first step in checking the column quality is to detect a gradient time course that influences the column quality downstream of the column. The significance of a gradient or of the controlled time course for the column can for example manifest itself in extreme pressure fluctuations that occur during the gradient on the column. Further influencing factors are gas emission that can occur due to the buffer composition in the column matrix, as well as temperature variations. In addition it has been found that gradients that have particularly steep slope sections are best suited for assessing the packing quality of a HPLC column. As a rule column regeneration before the product separation is such a critical step. At the same time there is a risk that possible column defects that are formed during the regeneration remain undetected before the separation which can have very negative consequences for the course of the separation.

Figure 28:
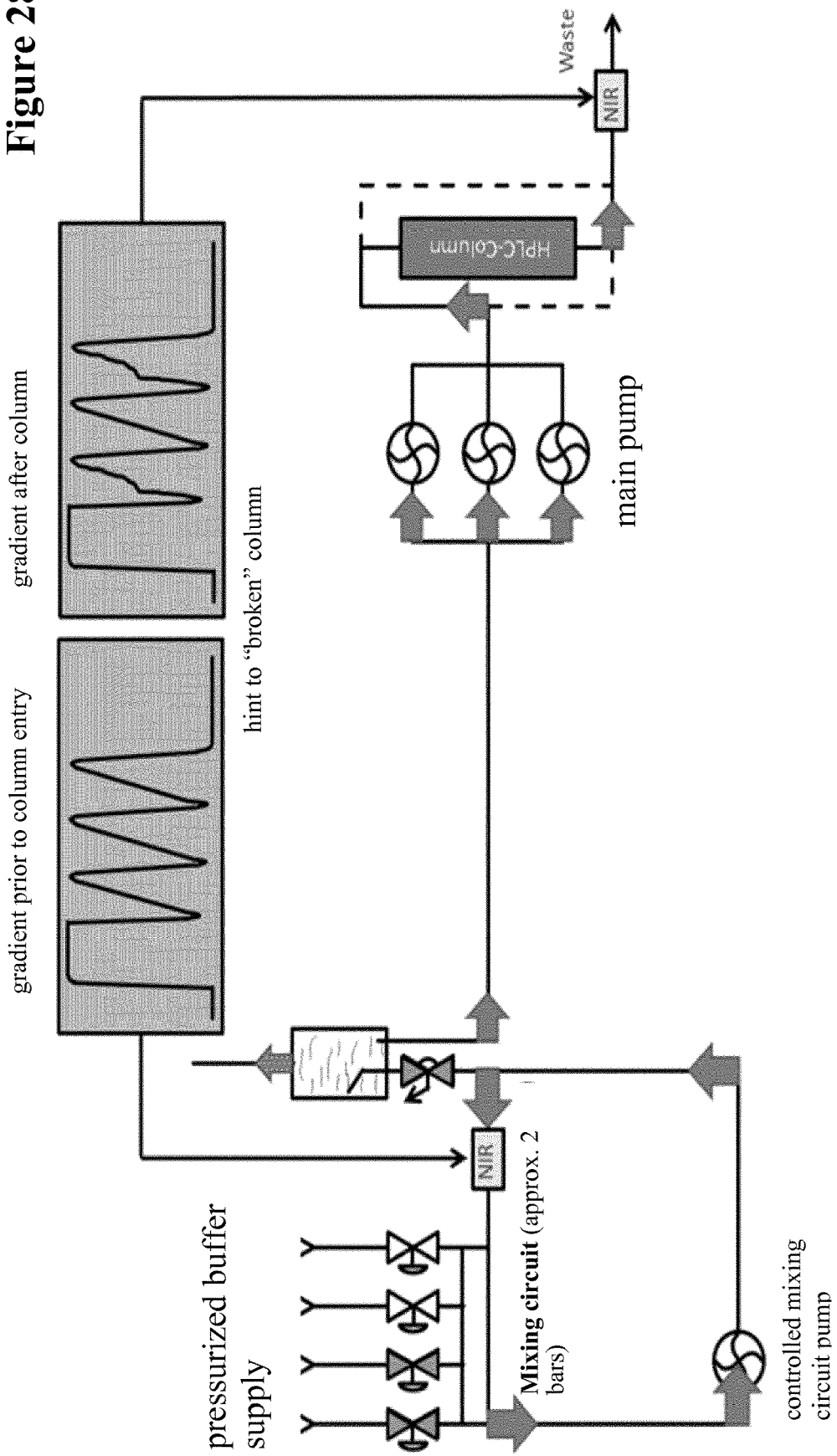

FIG. 28 shows an example of the procedure for checking the quality of the HPLC columns that are used, using a HPLC system which has a second NIR measurement downstream of the main pump. This additional NIR measurement can take place by means of an appropriate bypass either upstream of the column or downstream of the column. The first NIR measurement takes place upstream of the main pump. Hence, it is possible to check the column and gradient quality online. This diagram illustrates how in the process of matching both gradients (upstream of the column and downstream of the column) an indication for a defective column can be obtained. The differences in both gradient time courses give such an indication. The prerequisites for deducing such a conclusion are the following:

The gradient time course upstream of the column is unremarkable i.e. the gradient system functions faultlessly and a faultless gradient is transferred onto the column. The procedure for identifying and achieving this state is stated above (see FIGS. 23-26).

In case of doubt a system check has to be firstly carried out.

If no system influences are responsible for the abnormalities in the gradient time course downstream of the column, one must look for the cause in a defective packing Most damage to HPLC columns is due to crack formation which is caused by the high pressures that are common in the processes. The strain on the column packing is enormous because the material is continuously compressed and relaxed. After crack formation which preferentially takes place in the area of the column wall, an inhomogeneous distribution of the column packing and inhomogeneous oncoming flow onto the column occurs. This behaviour is due to the fact that liquids always choose the path of least resistance. In a column in which cracks have formed, the damaged areas of the column packing are preferably perfused because in this manner liquid can leave the column on the shortest route and can release tension. This behaviour is made visible by the NIR detector downstream of the column in particular in the case of a rapid exchange of the buffer composition. If, in the case of a change in the buffer composition upstream of the column, a change in the signal downstream of the column can be detected more rapidly than the delay caused by the so-called dead volume of the column, this is an indication for a defective column packing. Furthermore, the gradient time course that is recorded after damage to the column is usually not reproducible and irregular because the conditions in a damaged HPLC column packing are very labile and the damage rapidly spreads.

Figure 29:
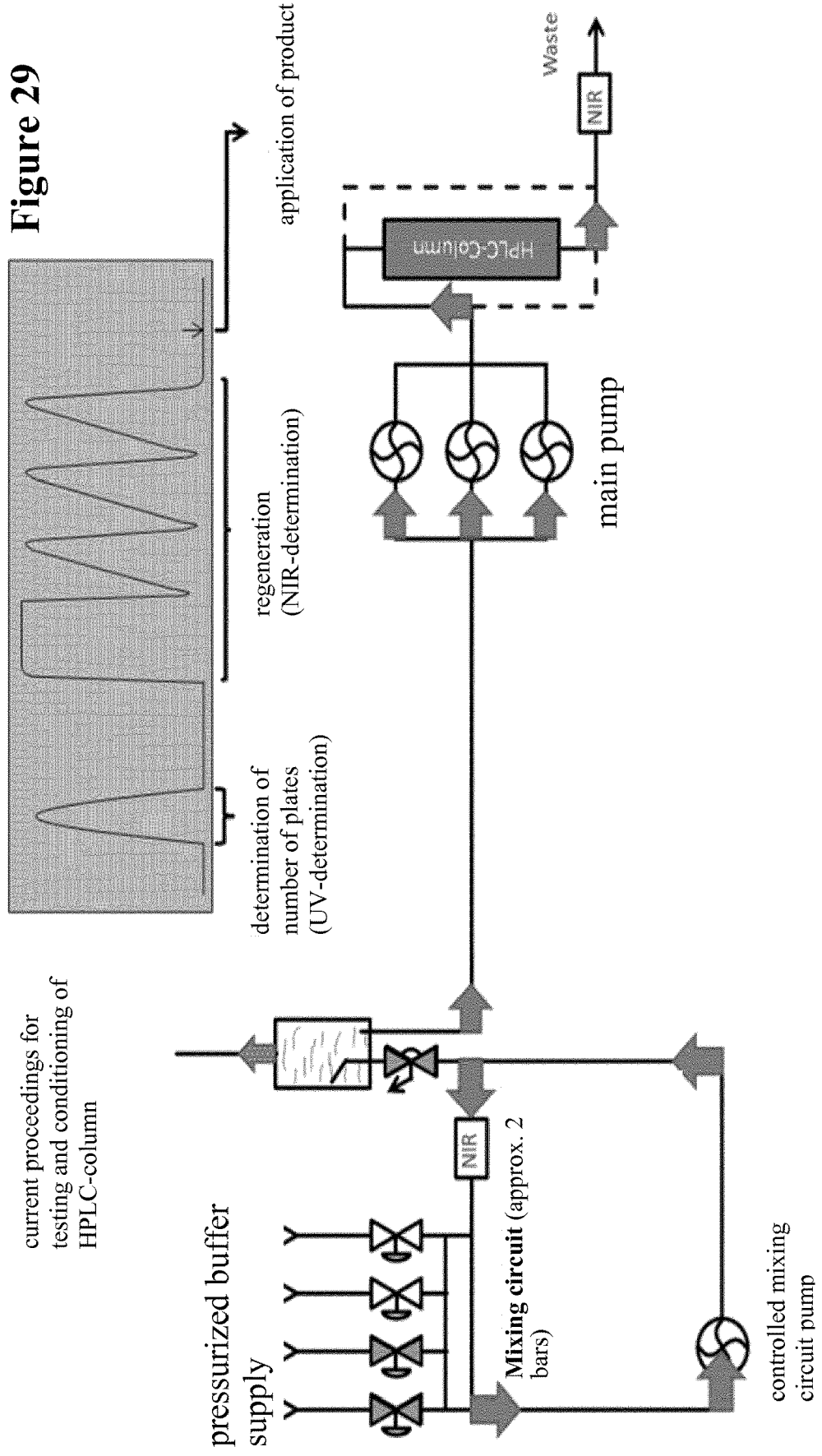

FIG. 29 shows as an example the procedure for checking the quality of the HPLC columns that are used. This check takes place by carrying out a so-called plate count determination (HETP). In this test one or more UV peaks are generated and evaluated. It must be ensured that the UV-active substances that are used to carry out the test are completely removed before the next product application in order to not impair the product quality. Hence, a regeneration usually has to be carried out after this test which, as already described for FIGS. 27 and 28, represents a particular strain for the column. It is not seldom that the test method itself also puts a high stress on the column. Product application and subsequent separation cannot take place until the column has been regenerated.

EXAMPLES

Example 1

Differences in the Gradient Time Course in HPLC Systems of Different Designs and Dimensions The gradient on an Äkta-HPLC system is exclusively controlled by the defined delivery volumes of the pumps but the actual gradient time course is not taken into consideration. Volume contraction effects are also not taken into consideration.

The process in a larger production dimension involves adjustment of the buffer composition by means of an NIR detector and consequently the actual buffer composition (gradient) is measured and adjusted.

The buffer is passed directly downstream of the mixing chamber via the conductivity measuring cell to the NIR detector while bypassing the usual annular valves. It is necessary to increase the flow rate to 60 ml/min because of the large line cross-section in order to have comparable flow conditions. The composition of buffers A and B is the same in both chromatographies.

The gradient of the previously used separation program was run and the data were at the same time recorded by the NIR detector. The values of both gradients from the Äkta chromatography (delivery rates of the gradient pumps) and the actually measured NIR signal downstream of the mixing chamber of the Äkta system was plotted in an Excel diagram (FIG. 15) taking into consideration a common starting point. The difference between the two gradients was determined and the program was corrected by this amount (FIG. 16) (see also my description to the figures).

The old gradient on the Äkta system was steeper in the first step and namely in the part in which elution already took place. As a result the peak width is less compared to the new gradient. The yields in the Äkta runs were higher than in the preparative runs which indicates a different course of the separation and thus also a different separation outcome.

The gradients optimized by means of a second downstream NIR measurement now results in a better agreement in the transfer of the gradients between the production system and the Äkta (see also my description of FIGS. 15 and 16).

Example 2

Eluent Quantities Discharged by the Bubble Trap Separated from the Mixing Circuit Use of an overflowable bubble trap allows excess eluent to be removed from the system in addition to the emitted gases. Since the dimension of the system is in accordance with the maximum column size to be operated, the discharged excess depends on the flow rate that is used and thus on the column diameter that is used.

When using a column of 30 cm diameter the flow rate is 162 l/h. The overflowable bubble trap is completely filled. Gas and only a small amount of excess eluent must be removed from the system (FIG. 20).

When using a column of 15 cm diameter the flow rate is 40.5 l/h. The overflowable bubble trap is completely filled. Gas and 121.5 l excess eluent must be removed from the system (FIG. 21).

When using a column of 10 cm diameter the flow rate is 18 l/h. The overflowable bubble trap is completely filled. Gas and 154 l excess eluent must be removed from the system (FIG. 22).

The superimposed gradients of the 10 cm and the 15 cm diameter chromatography column after opening and overflowing the bubble trap in the mixing circuit are shown in FIG. 3. Both curves are absolutely comparable.

The invention claimed is:

1. A chromatography system comprising, in fluid communication:
   a mixing circuit or a mixing chamber;
   a bubble trap,
      wherein the bubble trap is downstream of the mixing circuit or the mixing chamber,
      wherein the bubble trap has a permanent and continuous opening to the external environment via an upper outlet located on an upper surface of the bubble trap, and
      wherein the upper outlet does not comprise a valve;
   a first valve,
      wherein the first valve is between the bubble trap and the mixing circuit or the mixing chamber;

a main pump,
wherein the main pump is downstream of the bubble trap; and
a chromatography column,
wherein the chromatography column is downstream of the main pump.

2. The chromatography system according to claim 1, wherein the first valve is adjustable.

3. The chromatography system according to claim 1, further comprising a first volume flow measuring device and a second volume flow measuring device, wherein the first volume flow measuring device and the second volume flow measuring device are in fluid communication with the mixing circuit or the mixing chamber, the bubble trap, and the chromatography column, wherein the first volume flow measuring device is located downstream of the upper outlet, and wherein the second volume flow measuring device is located downstream of the chromatography column.

4. The chromatography system according to claim 1, further comprising a first concentration detector, wherein the first concentration detector is in fluid communication with the mixing circuit or the mixing chamber, the bubble trap, and the chromatography column, and wherein the first concentration detector is downstream of the main pump.

5. The chromatography system according to claim 4, further comprising a second concentration detector, wherein the second concentration detector is in fluid communication with the mixing circuit or the mixing chamber, and wherein the second concentration detector is located in the mixing circuit or the mixing chamber.

6. The chromatography system according to claim 5, wherein the chromatography column is located between the main pump and the first concentration detector.

7. The chromatography system according to claim 4, wherein the first concentration detector is located downstream of the main pump and the chromatography column.

8. The chromatography system according to claim 1, wherein the volume flows in the mixing circuit can be variably adjusted.

9. The chromatography system according to claim 1, wherein the chromatography system is configured to control pressure in the bubble trap independent of pressure.

* * * * *